US012679058B2

(12) United States Patent
Ferniani et al.

(10) Patent No.: US 12,679,058 B2
(45) Date of Patent: Jul. 14, 2026

(54) METHODS AND APPARATUS FOR INJECTION AND MANUFACTURE OF MOLDED COMPONENTS WITH VACUUM ASSIST

(71) Applicant: Crocs, Inc., Niwot, CO (US)

(72) Inventors: Stefano Ferniani, Padua (IT); Luca Faggin, Padua (IT)

(73) Assignee: Crocs, Inc., Broomfield, CO (US)

( * ) Notice: Subject to any disclaimer, the term of this patent is extended or adjusted under 35 U.S.C. 154(b) by 0 days.

(21) Appl. No.: 16/591,463

(22) Filed: Oct. 2, 2019

(65) Prior Publication Data

US 2020/0031073 A1      Jan. 30, 2020

Related U.S. Application Data

(63) Continuation-in-part of application No. 15/657,860, filed on Jul. 24, 2017, now Pat. No. 12,459,178.

(60) Provisional application No. 62/740,844, filed on Oct. 3, 2018, provisional application No. 62/365,582, filed on Jul. 22, 2016.

(51) Int. Cl.
  *B29D 35/00*      (2010.01)
  *B29C 43/36*      (2006.01)
  *B29C 65/00*      (2006.01)
  *B29D 35/12*      (2010.01)

(52) U.S. Cl.
  CPC ...... *B29D 35/0045* (2013.01); *B29C 43/3607* (2013.01); *B29C 66/00145* (2013.01); *B29D 35/122* (2013.01)

(58) Field of Classification Search
  CPC ...................... B29D 35/0045; B29D 35/0018
  See application file for complete search history.

(56) References Cited

U.S. PATENT DOCUMENTS

| | | | |
|---|---|---|---|
| 2,474,721 A | 6/1949 | Billner | |
| 3,335,462 A | 8/1967 | Grigull et al. | |
| 3,398,434 A | 8/1968 | Alesi et al. | |

(Continued)

FOREIGN PATENT DOCUMENTS

| | | | |
|---|---|---|---|
| CN | 1874656 A | 12/2006 | |
| CN | 104736312 A | 6/2015 | |

(Continued)

OTHER PUBLICATIONS

JP2005262494 machine translation (Year: 2005).*

(Continued)

*Primary Examiner* — Alison L Hindenlang
*Assistant Examiner* — Alexander A Wang
(74) *Attorney, Agent, or Firm* — Holland & Hart LLP

(57)      ABSTRACT

A molding process according to one embodiment of the present disclosure includes injecting a first molding material into a mold cavity of a mold, the mold cavity formed by at least a mold cavity portion of a first platen and a second platen when the first platen is in contact with the second platen; opening the mold by separating the first and second platens; placing a second molding material at the first molding material while the first molding material remains with the first platen or the second platen; sealing a space between the first and second platens; removing a gas from the space while the space is sealed; and closing the mold while the space is sealed.

16 Claims, 25 Drawing Sheets

(56) References Cited

U.S. PATENT DOCUMENTS

| | | | | |
|---|---|---|---|---|
| 4,277,435 | A * | 7/1981 | Allen | B29C 45/2708 |
| | | | | 264/328.12 |
| 5,395,226 | A * | 3/1995 | Sakai | B29C 45/14336 |
| | | | | 425/116 |
| 5,780,078 | A | 7/1998 | Chen | |
| 6,224,367 | B1 | 5/2001 | Maier | |
| 7,484,952 | B2 | 2/2009 | Hsu | |
| 7,622,062 | B2 | 11/2009 | Forster | |
| 2002/0028261 | A1 | 3/2002 | Alessio | |
| 2013/0037232 | A1 | 2/2013 | Pham et al. | |
| 2013/0260080 | A1 | 10/2013 | Roberts | |
| 2014/0001668 | A1 | 1/2014 | Hsu | |
| 2016/0082635 | A1 | 3/2016 | Kobayashi et al. | |
| 2016/0158981 | A1 | 6/2016 | Fitzpatrick | |
| 2017/0173857 | A1 | 6/2017 | Park et al. | |
| 2017/0348923 | A1 | 12/2017 | Rosso et al. | |
| 2018/0022000 | A1 | 1/2018 | Ferniani et al. | |
| 2018/0029315 | A1 | 2/2018 | Howland et al. | |
| 2018/0147802 | A1 * | 5/2018 | Isse | B29D 35/122 |

FOREIGN PATENT DOCUMENTS

| | | | | |
|---|---|---|---|---|
| JP | 2005262494 | * | 9/2005 | |
| KR | 20090126416 | A | 12/2009 | |

OTHER PUBLICATIONS

JP2005262494 abstract (Year: 2005).*

Paul E. Allen, "Injection-Mold Venting: The Hidden Processing Parameter," downloaded from http://logicseal.com/articles.html, 8 pages.

"Thermoset Injection Mold Design Tips," Plenco Plastics Engineering Company, Sheboygan, Wisconsin, Jan. 30, 2017, 17 pages.

Tim Toth, "The Use of Vents in the Injection Molding Process," Toth Mold/Die, Inc., Bedford, Ohio, Dec. 27, 2013, 5 pages.

Chinese Office Action and Search Report dated Jan. 21, 2019 received in related Chinese Patent Application No. 2017106072736 (6 pages).

* cited by examiner

200

202

201

1300

1302 — INJECT A FIRST MOLDING MATERIAL INTO A MOLD CAVITY

1304 — OPEN THE MOLD

1306 — PLACE A SECOND MOLDING MATERIAL

1308 — PLACE A THIRD MOLDING MATERIAL

1310 — SEAL A SPACE IN THE MOLD

1312 — REMOVE A GAS FROM THE SPACE

1314 — CLOSE THE MOLD WHILE THE SPACE IS SEALED

1316 — OPEN THE MOLD AND REMOVE THE FINISHED PRODUCT

METHODS AND APPARATUS FOR INJECTION AND MANUFACTURE OF MOLDED COMPONENTS WITH VACUUM ASSIST

RELATED APPLICATIONS

This application is a continuation-in-part of U.S. patent application Ser. No. 15/657,860, filed on Jul. 24, 2017, which claims the benefit of U.S. Provisional Patent Application No. 62/365,582, filed on Jul. 22, 2016, titled "METHODS AND APPARATUS FOR INJECTION AND MANUFACTURE OF MOLDED COMPONENTS WITH VACUUM ASSIST," and this application also claims the benefit of U.S. Provisional Patent Application No. 62/740,844, filed on Oct. 3, 2018, titled "METHODS AND APPARATUS FOR INJECTION AND MANUFACTURE OF MOLDED COMPONENTS WITH VACUUM ASSIST," the disclosures of each aforementioned application are hereby incorporated by reference in their entireties.

TECHNICAL FIELD

Embodiments of the present disclosure relate to injection molding. More specifically, embodiments of the present disclosure relate to vacuum-assisted injection molding of articles.

BACKGROUND

Injection molding is a process that can be used for manufacturing various types of articles. The process generally involves injecting a material into a mold, which shapes the material into articles. Single injection parts may be further processed by moving them to some other mold and/or performing other labor intensive practices.

SUMMARY

A molding process according to one embodiment of the present disclosure includes injecting a first molding material into a mold cavity of a mold, the mold cavity formed by at least a mold cavity portion of a first platen and a second platen when the first platen is in contact with the second platen; opening the mold by separating the first and second platens; placing a second molding material at the first molding material while the first molding material remains with the first platen or the second platen; sealing a space between the first and second platens; removing a gas from the space while the space is sealed; and closing the mold while the space is sealed.

According to some embodiments, opening the mold by separating the first and second platens includes opening the mold by separating the first and second platens by a first distance. The process may further include closing the mold until the first and second platens are separated by a second distance that is smaller than the first distance, after placing the second molding material at the first molding material.

According to some embodiments, closing the mold while the space is sealed includes joining the first material to the second material. Sealing the space between the first and second platens may include placing a sealing device to cover an opening to the space. Placing a sealing device to cover an opening to the space may include placing a frame that is coupled to at least two gasket rings to cover the opening to the space, wherein a first gasket ring is in contact with the first platen and a second gasket ring is in contact with the second platen.

According to some embodiments, the sealing device may actuate between a first position and a second position, wherein in the first position the sealing device is clear of the injection port, and wherein in the second position, the sealing device seals the space. The sealing device may actuate between the first and second positions by a pneumatic control and/or a hydraulic control.

According to some embodiments, removing a gas from the space while the space is sealed includes creating a vacuum in the space. Sealing a space between the first and second platens may include sealing off an opening to the space.

According to some embodiments, the process further includes closing an injection channel of the mold before placing the second molding material. The process may further include closing the injection channel of the mold by actuating a selective blocking element in the injection channel.

According to some embodiments, the process further includes placing at least one centering pin through at least one hole in the second molding material. The process may further include resting at least one centering pin in at least one pin hole.

A molding process according to one embodiment of the present disclosure includes injecting a first molding material into a mold cavity of a mold, the mold cavity formed by at least a mold cavity portion of a first platen and a second platen when the first platen is in contact with the second platen; opening the mold by separating the first and second platens; placing a second molding material between the first and second platens while the first molding material remains between the first and second platens; sealing a space between the first and second platens while the first and second molding materials remain between the first and second platens; removing a gas from the space while the space is sealed; and closing the mold while the space is sealed.

A molding system according to one embodiment of the present disclosure includes a mold, the mold including a first platen, a second platen and a mold cavity, the mold cavity formed by at least a mold cavity portion of a first platen and a second platen when the first platen is in contact with the second platen; a sealing device that is configured to seal a space between the first and second platens; and a gas remover that is configured to remove a gas from the space between the first and second platens while the space is sealed.

According to some embodiments, the molding system further includes means for injecting a first molding material into the mold cavity, means for opening the mold by separating the first and second platens, and means for placing a second molding material between the first and second platens while the first molding material remains with the first platen or the second platen.

According to some embodiments, the sealing device may include an actuator. The actuator may include at least one dual cylinder. The sealing device may include a frame that is coupled to at least two gasket rings. The at least two gasket rings may include silicon. In some embodiments, the actuator may be a pneumatic control system and/or a hydraulic control system.

According to some embodiments, at least one of the first platen and the second platen includes a selective blocking element configured to selectively block an injection channel in the mold. The selective blocking element may be mechanically actuated.

According to some embodiments, at least one of the first platen and the second platen includes an overflow channel, at least one centering pin, and/or at least one pin hole.

BRIEF DESCRIPTION OF THE DRAWINGS

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

DETAILED DESCRIPTION

Figure 1:
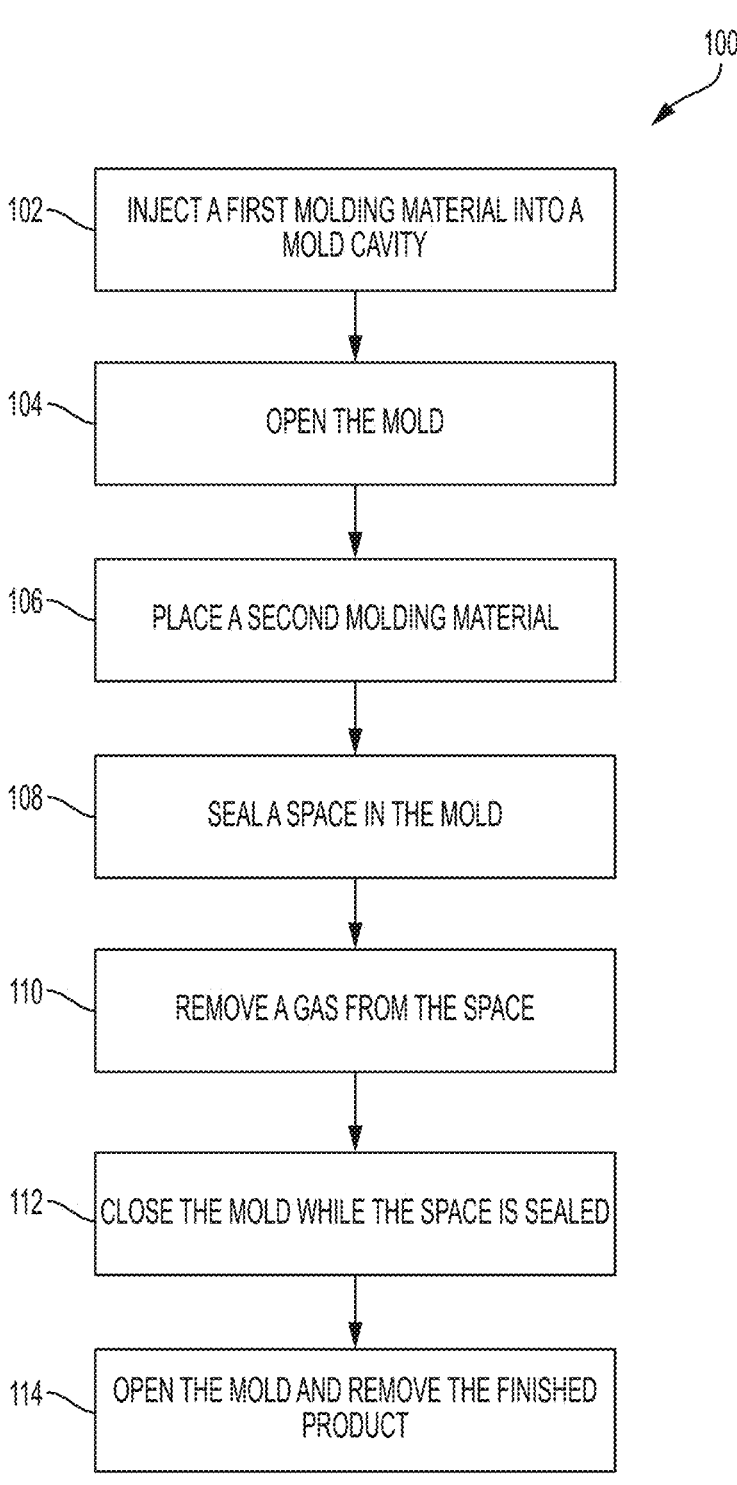
FIG. 1 illustrates an exemplary process for manufacturing a product of a molding system according to embodiments of the present disclosure.

FIG. 1 illustrates an exemplary process for manufacturing one or more products of a molding system. Products of the molding system manufactured according to the method 100 comprise two molding materials. Examples of these products include footwear, toys, sporting goods, eyewear, medical supplies, kitchenware, auto parts, furniture, or any other product that may be manufactured using a molding system.

Figure 2:
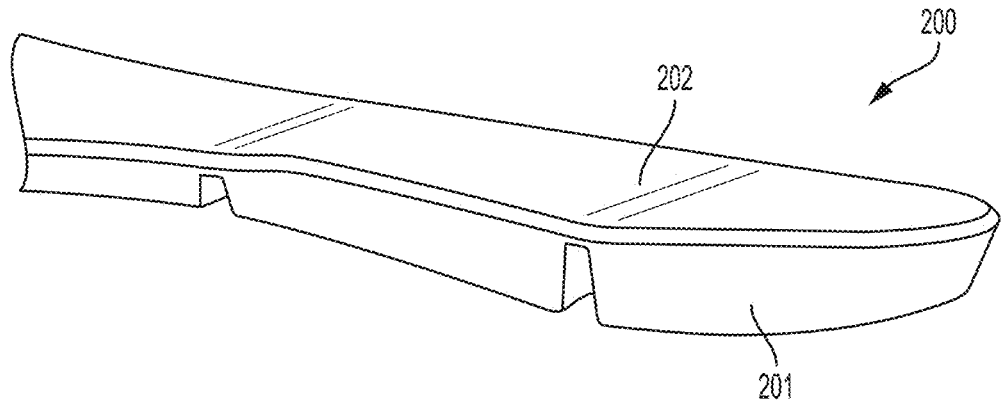
FIG. 2 illustrates a partial perspective view of an exemplary product of a molding system.

FIG. 2 illustrates an exemplary product, an insole 200, of the molding system. The insole 200 comprises a first molding material 201 and a second molding material 202. Although not required, the first molding material 201 and second molding material 202 may be different in terms of at least one of their characteristics such as the shape, color, texture, dimension, composition, or any other characteristic. For example, the first molding material 201 is purple-colored ethylene vinyl acetate (EVA), while the second molding material 202 is yellow-colored EVA and is thinner than the first molding material 201. In other embodiments, the first molding material 201 may be EVA, while the second molding material 202 may be a non-EVA material.

Figure 3:
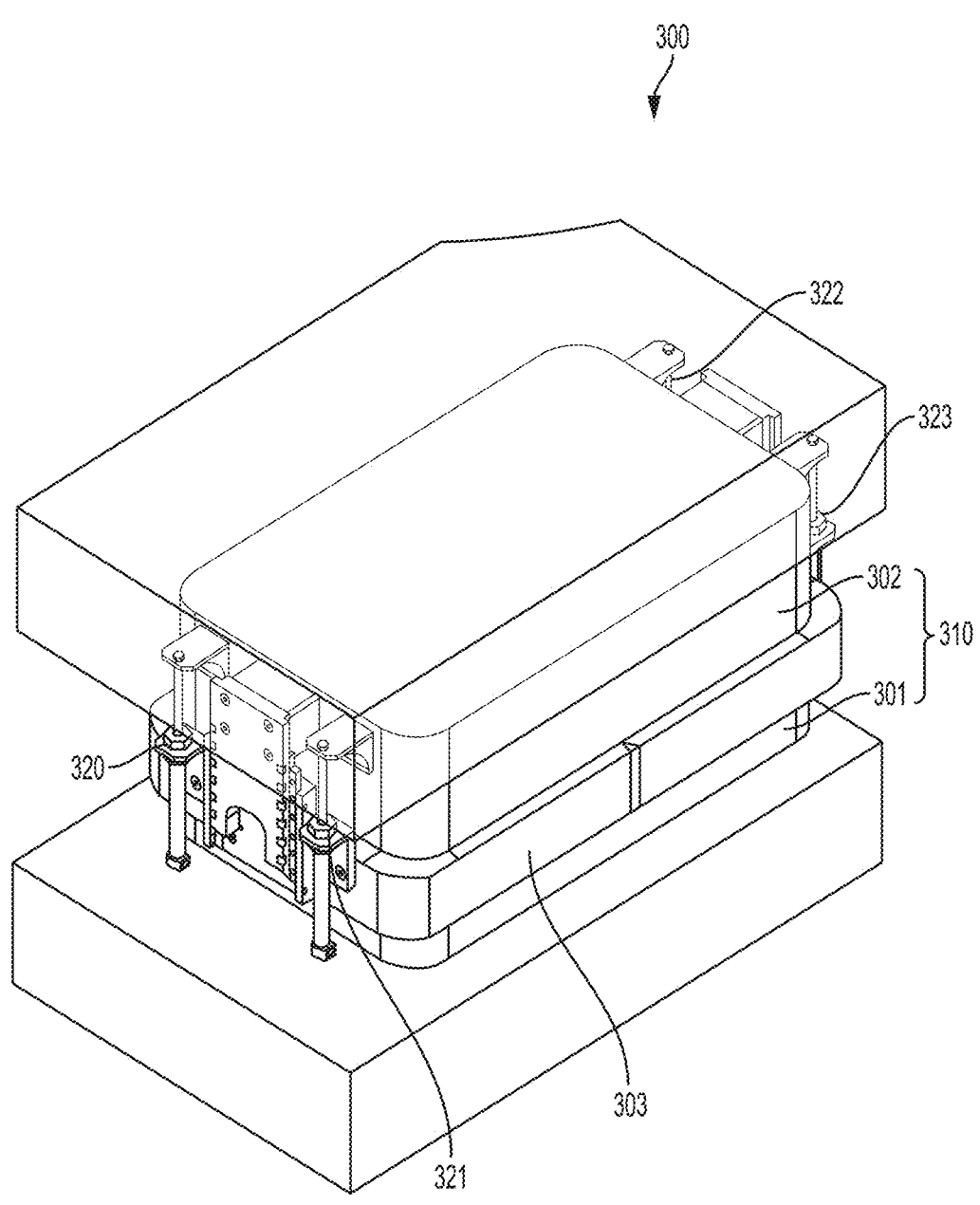
FIG. 3 illustrates a schematic of an exemplary molding system.

FIG. 3 illustrates a schematic of an exemplary molding system 300 for manufacturing a product. A molding system 300 includes a mold 310, which comprises a first platen 301 and a second platen 302. The molding system 300 may be used to produce the insole 200.

Figure 4:
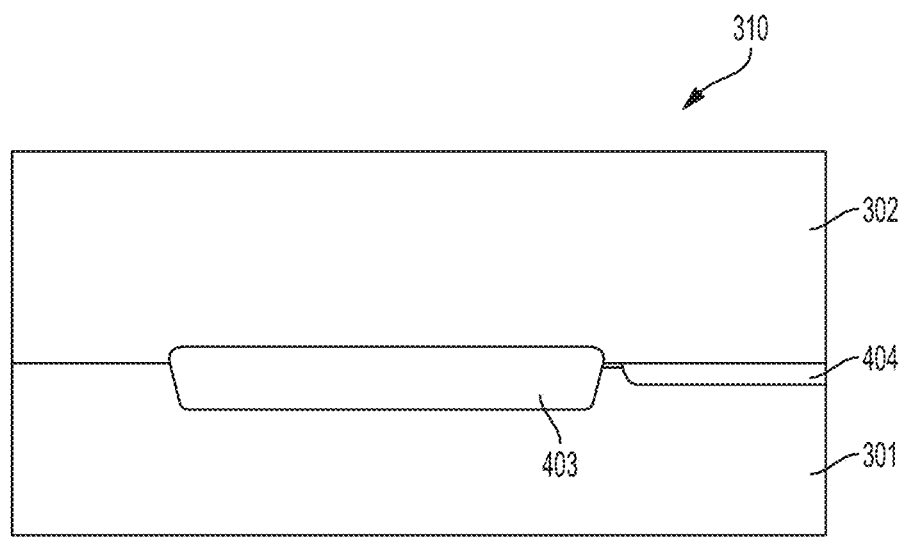
FIG. 4 illustrates a schematic of an exemplary mold which may be a part of the exemplary molding system in FIG. 3, wherein the mold is closed.

FIG. 4 illustrates a cross-sectional schematic of an exemplary mold 310 which may be a part of the exemplary molding system 300 as shown in FIG. 3. In some embodiments, the mold 310 consists of a first platen 301 and a second platen 302. In FIG. 4, the first platen 301 is located at the bottom and the second platen 302 is located at the top. However, in some embodiments, the first platen 301 is located next to the second platen 302 in a vertical arrangement.

FIG. 4 illustrates a mold with two platens. In other embodiments, the number of platens in a mold is greater than two. A plurality of platens may be placed horizontally, vertically, or in any other possible arrangement to form a mold.

FIG. 4 illustrates a mold cavity 403. The mold cavity 403 defines the shape of a product that is manufactured using the mold 310. The mold cavity 403 is formed by at least a mold cavity portion of a first platen 301 and a second platen 302 when the first platen 301 is in contact with the second platen 302. Generally, when a molding material is inserted into the molding cavity 403 and is cured, a product of the molding system is manufactured in the shape of the mold cavity 403.

At block 102, the method 100 involves injecting a first molding material into the mold cavity 403. The first molding material is generally in an uncured form. The molding system 300 cures the molding material. During the curing process, the molding material usually goes through a solidification process. FIG. 2 illustrates an exemplary first molding material 201 of the insole 200 after the first molding material has been cured.

Generally, the first molding material is inserted into the mold 310 through an outer opening 404 while the mold 310 is closed. The mold 310 is closed when the first platen 301 is in contact with the second platen 302 as shown in FIG. 4. In some embodiments, when the mold 310 is closed, the mold cavity 403 may be externally accessed through the opening 404 and not through a seal (e.g. as sealed by a sealing ring 303, which will be described further below). In some embodiments, when the mold 310 is closed, an exchange of a gas between inside and outside the mold cavity occurs through the opening 404 and not through the seal. In other embodiments, when the mold 310 is closed, an exchange of a gas between inside and outside the mold cavity occurs primarily through the opening 404.

Figure 5:
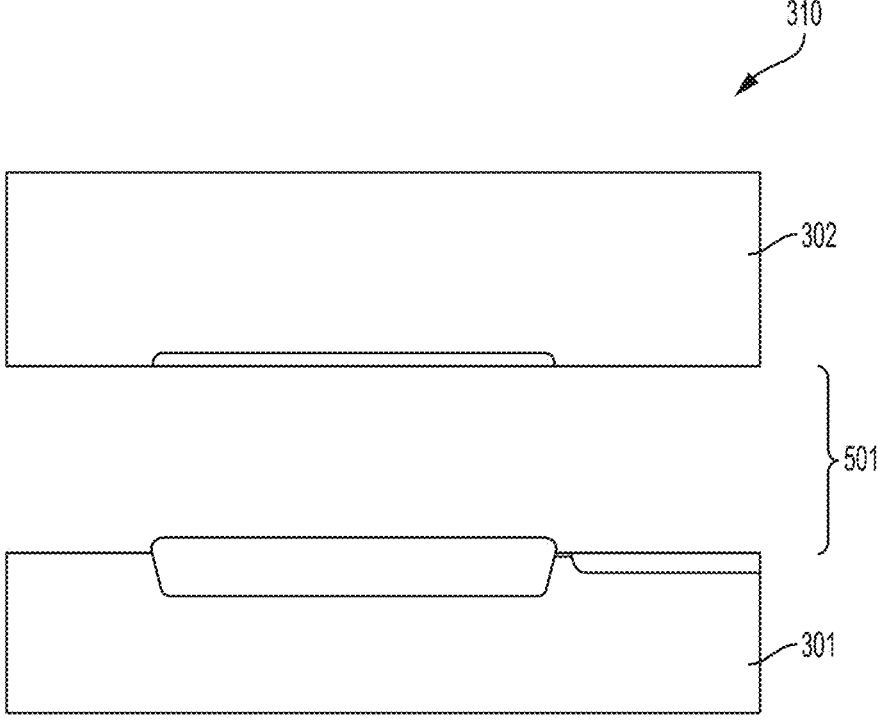
FIG. 5 illustrates a schematic of an exemplary mold which may be a part of the exemplary molding system in FIG. 3, wherein the mold is open.

At block 104, the method 100 involves opening the mold 310. In some embodiments, the mold 310 is open if the first platen 301 is not in contact with the second platen 302 as shown in FIG. 5. In some embodiments, a distance 501 between the first platen 301 and the second platen 302 may or may not vary from one opening of the mold 310 to another opening of the mold 310. The mold 310 may be opened manually by at least one person, automatically by at least one machine, or semi-automatically by at least one person and at least one machine.

Figure 6:
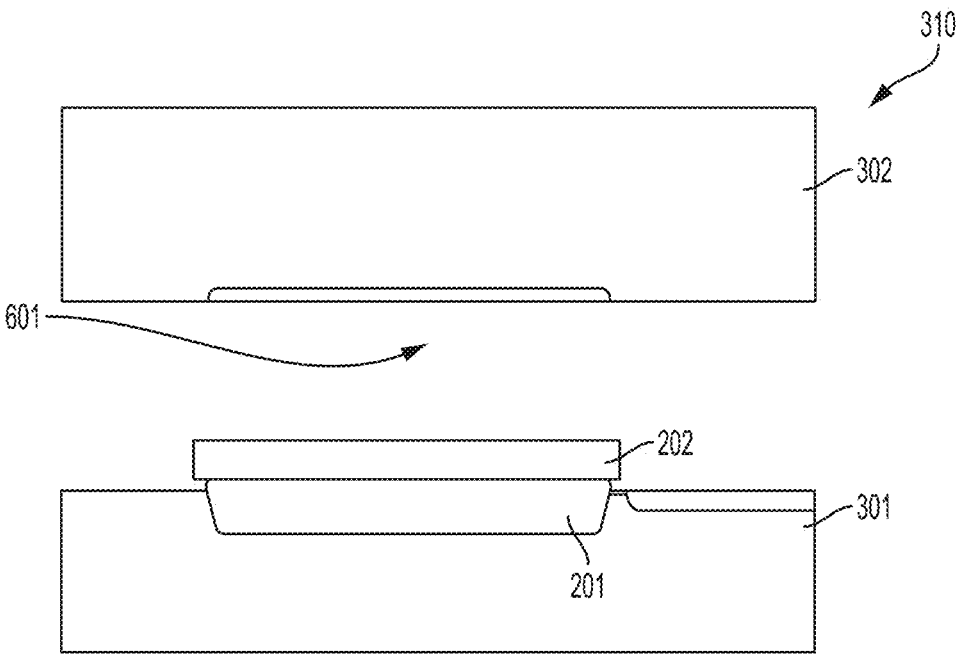
FIG. 6 illustrates a schematic of an exemplary mold which may be a part of the exemplary molding system in FIG. 3, wherein the mold is open and two molding materials are inside the mold.

At block 106, the method 100 involves placing the second molding material 202 through the space between the first platen 301 and the second platen 302 as shown in FIG. 6. The second molding material 202 is placed at the first molding material 201 while the first molding material 201 remains with the first platen 301 as shown in FIG. 6. In some embodiments, the second molding material can be in a cured form.

In some embodiments, the second molding material 202 is placed on top of the first molding material 201 as shown in FIG. 6. FIG. 6 shows the second molding material 202 covering the entire top surface of the first molding material 201. An exemplary product of a molding system made from this setting is the insole 200 in FIG. 2. In some embodiments, the second molding material 202 may cover less than the entire top surface of the first molding material 201. In other embodiments, the second molding material may cover at least some portion of one or more sides of the first molding material 201.

At block 108, the method 100 involves sealing a space 601 in the mold 310 between the first platen 301 and the second platen 302 as shown in FIG. 6. The space 601 includes the space representing the mold cavity 403 which is shown in FIG. 4. When the first platen 301 is not in contact with the second platen 302, the space 601 is larger than the space occupied by the mold cavity 403. In other words, if the mold 310 is open, the volume of the space 601 is larger than the volume of the mold cavity 403.

Figure 7:
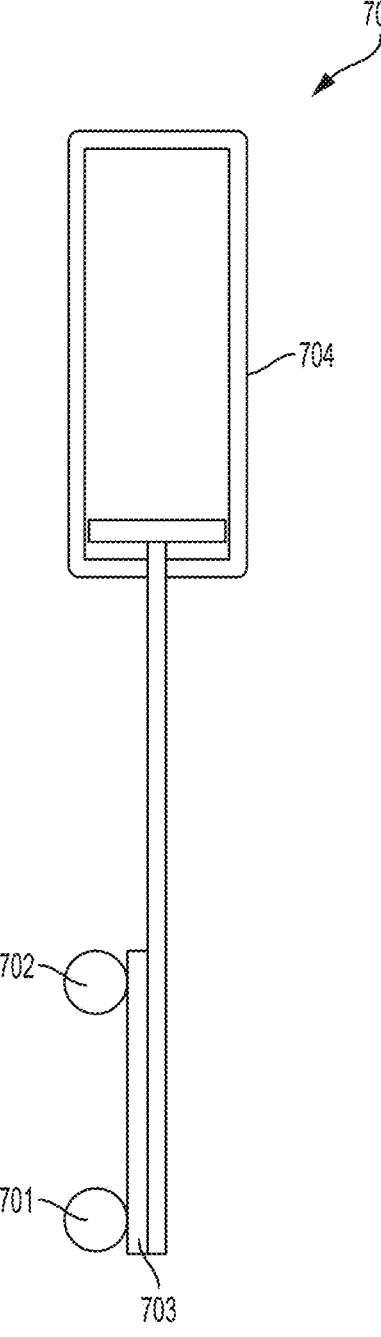
FIG. 7 illustrates a schematic of an exemplary sealing device which may be a part of the exemplary molding system in FIG. 3.

In some embodiments, the space 601 is sealed using a sealing device 700 as shown in FIG. 7. The sealing device 700 comprises a first gasket 701 and a second gasket 702. In some embodiments, a gasket may be manufactured using a heat-resistant material, such as silicon. The first gasket 701 and the second gasket 702 are coupled to a frame 703. The frame 703 is coupled to an actuator. In some embodiments, the actuator can be a pneumatic control system 704 or a hydraulic control system. The pneumatic control system 704 or hydraulic control system is actuated to move the frame 703, which in turn moves the first gasket 701 and the second gasket 702. The first gasket 701 and the second gasket 702 may move in a certain direction—for example, up and down in a vertical direction. In other embodiments, the space 601 is sealed using an alternative sealing device, for example foam, adhesive, sealant, a baffle or sleeve, and/or the like. Alternative sealing devices may be coupled to different types of actuators. An example of an actuator is a pneumatic control system 704. Another example of an actuator is a hydraulic control system. As used herein, "sealed" is used in its broadest sense to refer to an arrangement that deters, minimizes, or reduces the passage or flow of gas into the mold cavity 403 or the space 601 from outside the mold 310.

As shown in FIG. 3, in some embodiments, the molding system 300 comprises a plurality of actuators, each of which may comprise at least two gaskets. FIG. 3 shows the molding system 300 with four pneumatic control systems (320, 321, 322, and 323). In some embodiments, these pneumatic control systems are coupled to a sealing ring 303 as shown in FIG. 3. The pneumatic control systems 320, 321, 322, and 323 may be used to place the sealing ring 303 to cover the lining between the first platen 301 and the second platen 302. The sealing ring 303 is used to ensure that the space 601 inside the mold 310 is sealed to deter, minimize, or reduce any entrance of gas (e.g. air) into the mold cavity 403 or the space 601 from outside the mold 310.

Figure 8:
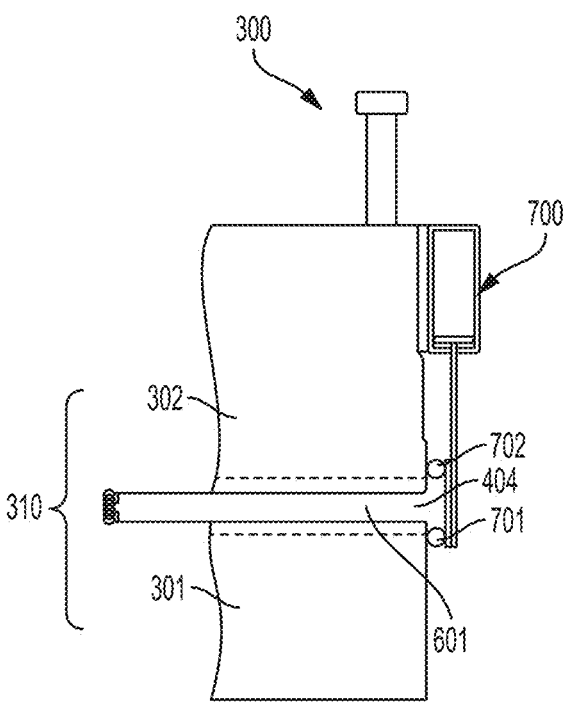
FIG. 8 illustrates a cross-sectional schematic of the exemplary molding system in FIG. 3 with the exemplary sealing device in FIG. 7.

FIG. 8 illustrates an exemplary cross-sectional schematic of the position in which the sealing device 700 is used to seal the space 601 when the first platen 301 is not in contact with the second platen 302. The space 601 is sealed when a gas exchange between inside the space 601 and outside the space 601 is deterred, minimized, or reduced. By covering the opening 404, the space 601 may be hermetically or substantially sealed. In some embodiments, the space 601 is sealed by placing the first gasket 701 in contact with the first platen 301, and the second gasket 702 in contact with the second platen 302.

At block 110, the method 100 involves removing a gas from the space 601. In some embodiments, the gas is removed by at least one gas remover that is coupled to the space 601. In some embodiments, removing the gas creates a vacuum in the space 601. When the gas is removed from the space 601, any pocket of gas inside the first molding material 201 or the second molding material 202, or any pocket of gas between the first molding material 201 and the second molding material 202 may be reduced or eliminated.

Removing the gas from the space 601 helps to prevent any pocket of gas from being formed inside the first molding material 201 or the second molding material 202, or between the first molding material 201 and the second molding material 202, when the mold 310 closes.

The mold 310 closes when the distance 501 between the first platen 301 and the second platen 302 becomes shorter. In some embodiments, the mold is considered closed when the distance 501 is zero.

Figure 9:
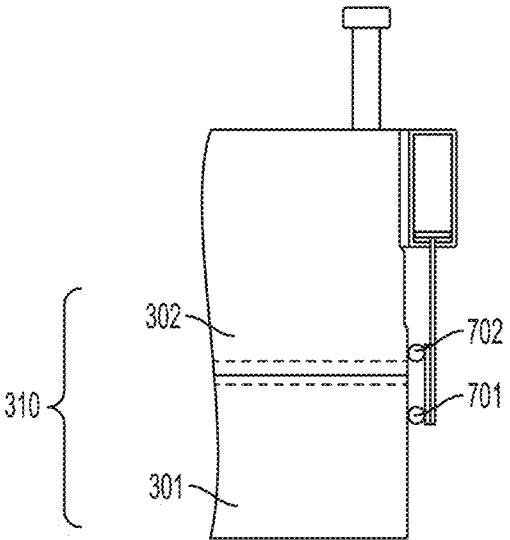
FIG. 9 illustrates a cross-sectional schematic of the exemplary molding system in FIG. 3 with the exemplary sealing device in FIG. 7.

At block 112, the method 100 involves closing the mold 310 while the space 601 is sealed. As used herein, "closing" is used to refer to when the distance between platens (e.g. platens comprising the first platen 301 and the second platen 302) is decreasing, or when the volume of a space between platens (e.g. the space 601) is decreasing. In some embodiments, the mold 310 is closed by placing the first platen 301 in contact with the second platen 302 while the first gasket 701 is in contact with the first platen 301 and the second gasket 702 is in contact with the second platen 302, as shown in FIG. 9. In some embodiments, when the mold 310 is closed, the second molding material 202 attaches to the first molding material 201.

Figure 10:
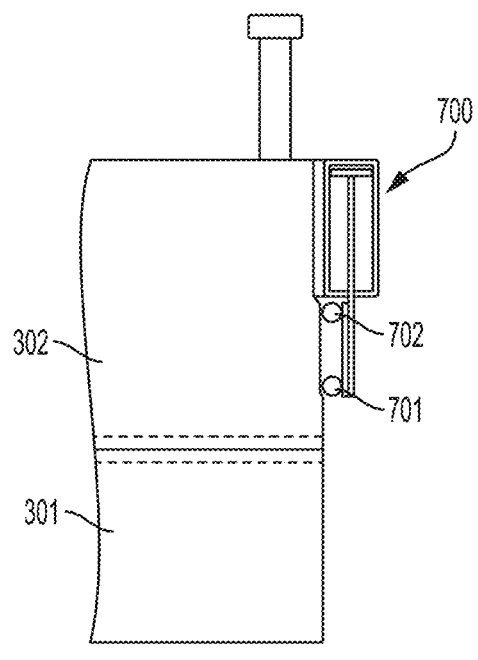
FIG. 10 illustrates a cross-sectional schematic of the exemplary molding system in FIG. 3 with the exemplary sealing device in FIG. 7.

In some embodiments, the sealing device 700 returns to a position in which the first gasket 701 is no longer in contact with the first platen 301 as shown in FIG. 10.

Figure 11:
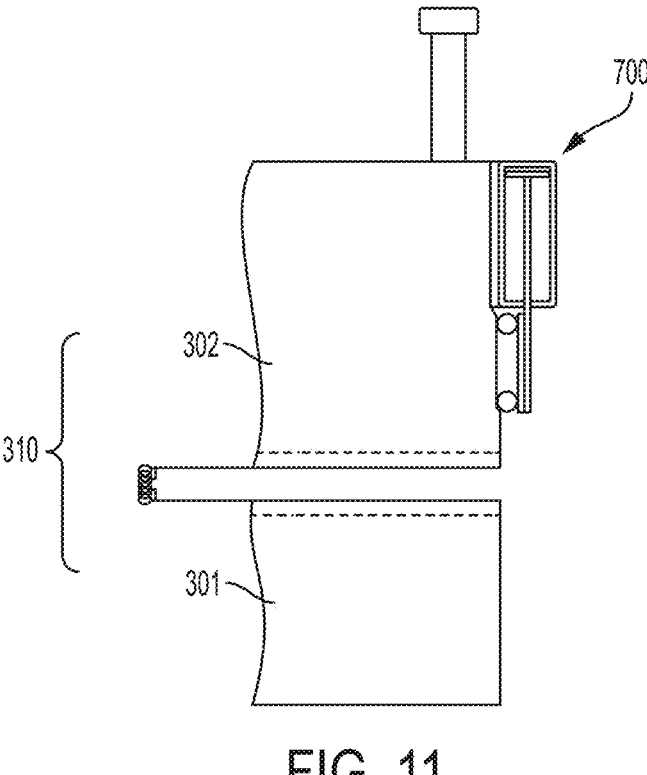
FIG. 11 illustrates a cross-sectional schematic of the exemplary molding system in FIG. 3 with the exemplary sealing device in FIG. 7.

At block 114, the method 100 involves opening the mold 310 and removing the finished product. FIG. 11 shows a cross-sectional schematic of the position of the mold 310 and the sealing device 700 when the mold is open.

Embodiments of the present disclosure also permit a product of the molding system 300 to be manufactured with a single molding material, or with more than two molding materials. Such embodiments can be implemented by modifying the method 100.

Figure 12:
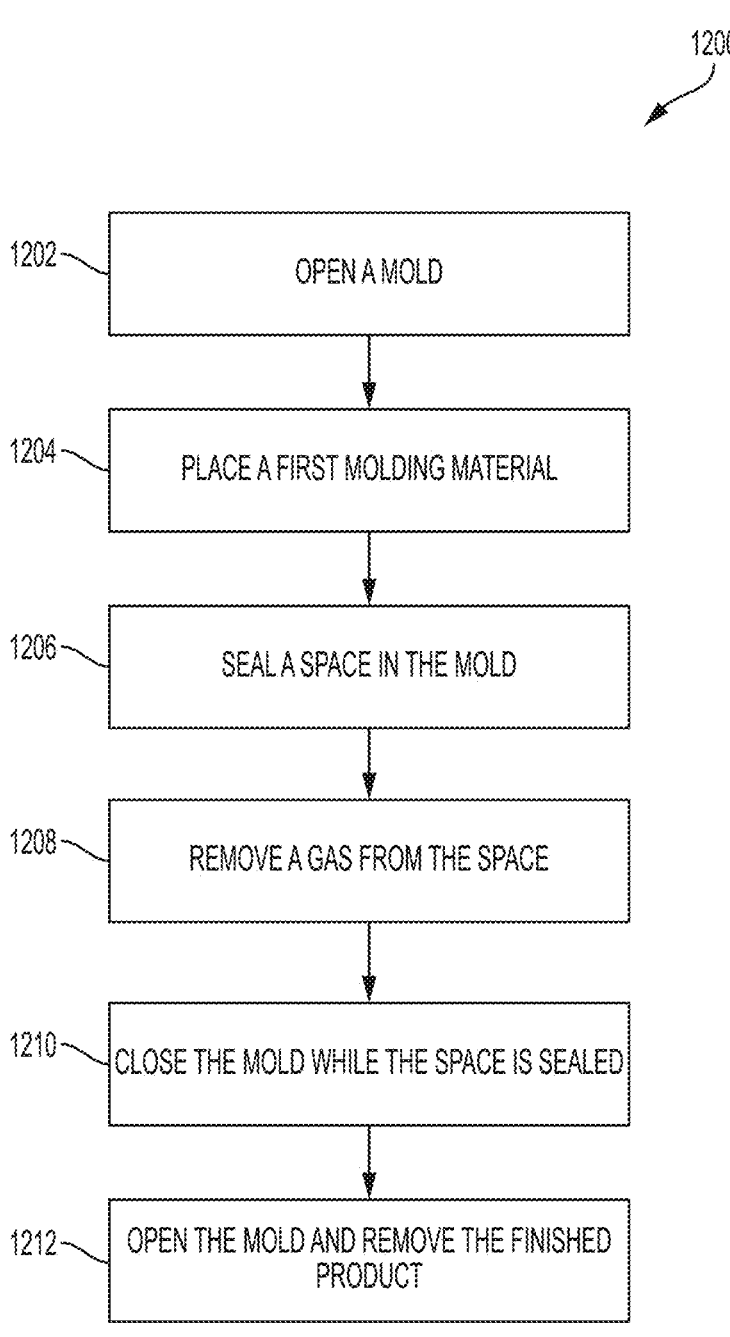
FIG. 12 illustrates an exemplary process for manufacturing a product of a molding system according to embodiments of the present disclosure.
Figure 13:
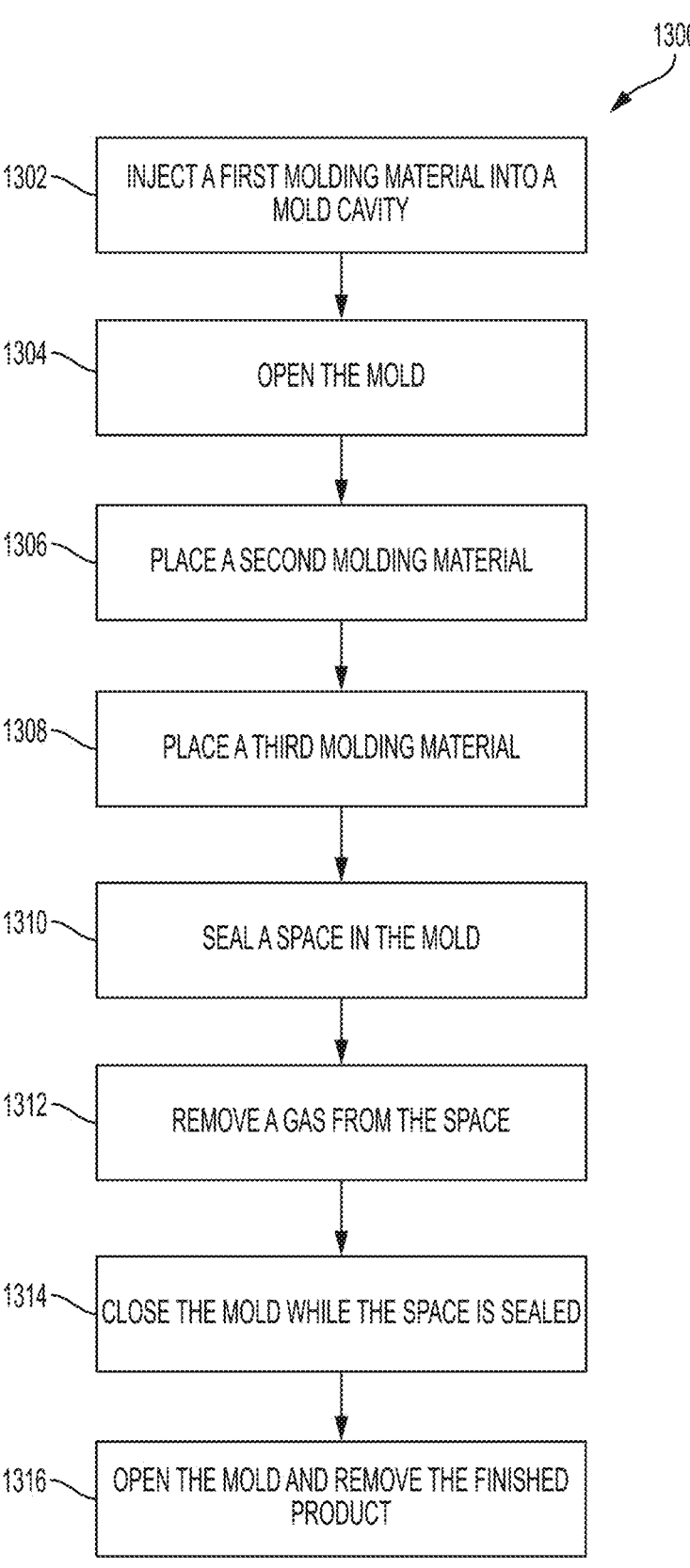
FIG. 13 illustrates an exemplary process for manufacturing a product of a molding system according to embodiments of the present disclosure.
Figure 14:
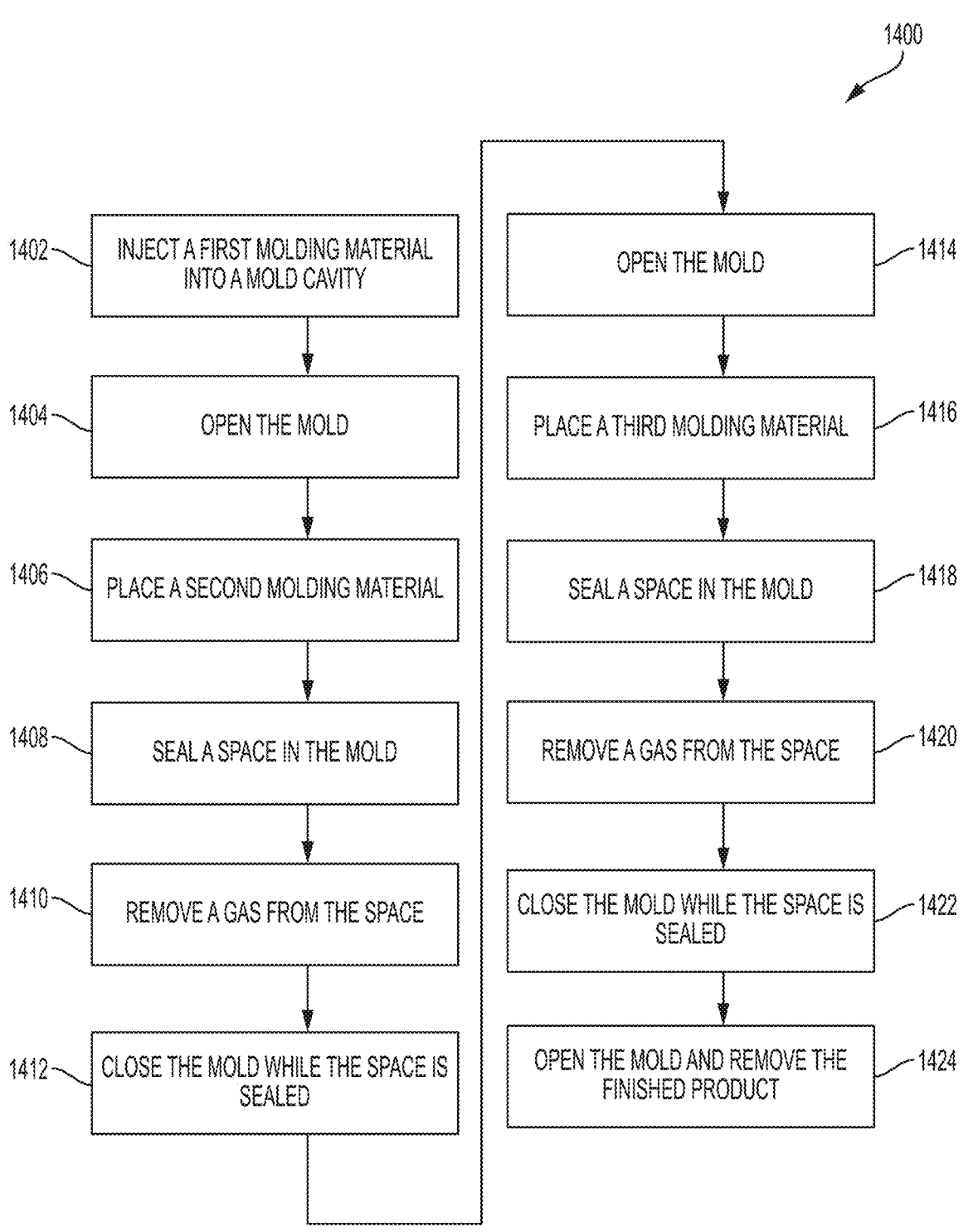
FIG. 14 illustrates an exemplary process for manufacturing a product of a molding system according to embodiments of the present disclosure.

FIGS. 12, 13, and 14 illustrate exemplary processes for manufacturing one or more products of a molding system.

FIG. 12 illustrates a method 1200. Products of the molding system manufactured according to the method 1200 comprise one molding material. The method 1200 includes opening a mold (block 1202). For example, the mold is open if the first platen is not in contact with the second platen, as described above with respect to FIG. 5. A material may be placed into the mold (block 1204). A space in the mold is sealed (block 1206). For example, the space may be sealed by using a sealing device, as described above with respect to FIG. 8. A gas from the space is removed (block 1208). While the space is sealed, the mold is closed (block 1210). For example, the mold may be closed by placing the first platen in contact with the second platen while the space is sealed, as described above with respect to FIG. 9. The mold is opened and the finished product is removed (block 1212).

FIG. 13 illustrates a method 1300. Products of the molding system manufactured according to the method 1300 comprise three molding materials. The method 1300 includes injecting a first molding material into a mold cavity (block 1302). For example, the first molding material may be injected through an outer opening while the mold is closed, as described above. An example of a closed mold is shown in FIG. 4. The mold is opened (block 1304). For example, the mold is open if the first platen is not in contact with the second platen, as described above with respect to FIG. 5. A second molding material is placed into the mold (block 1306). For example, the second molding material may be placed through the space between two platens, as described above with respect to FIG. 6. A third molding material is placed into the mold (block 1308). For example, the third molding material may be placed through the space between two platens similar to the way the second molding material was placed in block 1306 above. A space in the mold is sealed (block 1310). For example, the space may be sealed by using a sealing device, as described above with respect to FIG. 8. A gas from the space is removed (block 1312). While the space is sealed, the mold is closed (block 1314). For example, the mold may be closed by placing the first platen in contact with the second platen while the space is sealed, as described above with respect to FIG. 9. The mold is opened and the finished product is removed (1316).

FIG. 14 illustrates a method 1400. Products of the molding system manufactured according to the method 1400 comprise three molding materials. The method 1400 includes injecting a first molding material into a mold cavity (block 1402). For example, the first molding material may be injected through an outer opening while the mold is closed, as described above. An example of a closed mold is shown in FIG. 4. The mold is opened (block 1404). For example, the mold is open if the first platen is not in contact with the second platen, as described above with respect to FIG. 5. A second molding material is placed into the mold (block 1406). For example, the second molding material may be placed through the space between two platens, as described above with respect to FIG. 6. A space in the mold is sealed (block 1408). For example, the space may be sealed by using a sealing device, as described above with respect to FIG. 8. A gas from the space is removed (block 1410). While the space is sealed, the mold is closed (block 1412). For example, the mold may be closed by placing the first platen in contact with the second platen while the space is sealed, as described above with respect to FIG. 9. The mold is opened (block 1414). For example, the mold is open if the first platen is not in contact with the second platen, as described above with respect to FIG. 5. A third molding material is placed into the mold (block 1416). For example, the third molding material may be placed through the space between two platens similar to the way the second molding material was placed in block 1406 above. A space in the mold is sealed (block 1418). For example, the space may be sealed by using a sealing device, as described above with respect to FIG. 8. A gas from the space is removed (block 1420). While the space is sealed, the mold is closed (block 1422). For example, the mold may be closed by placing the first platen in contact with the second platen while the space is sealed, as described above with respect to FIG. 9. The mold is opened and the finished product is removed (1424).

Using various combinations of the blocks in FIGS. 1, 12, 13, and 14, products of a molding system may be manufactured with one, two, three, four, or any other number of molding materials.

Figure 21:
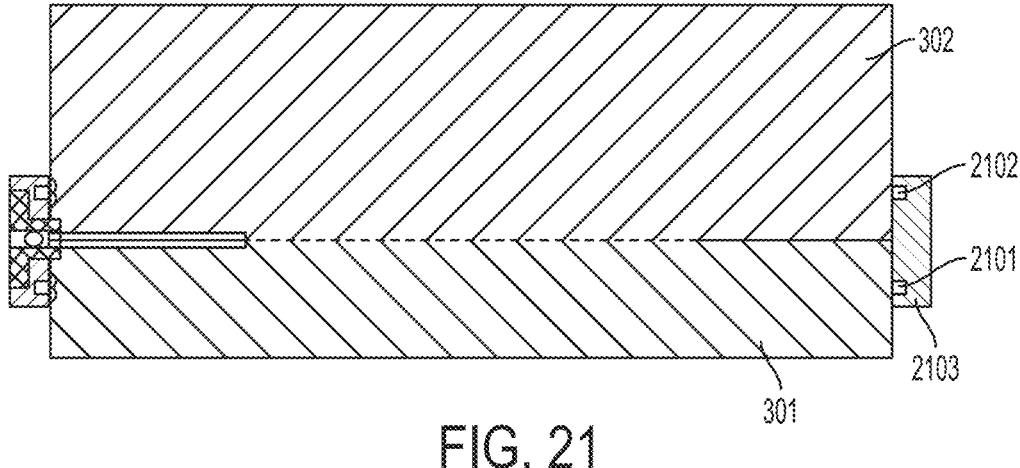
FIG. 21 illustrates an exemplary sealing device that is in a fixed position relative to a platen.
Figure 22:
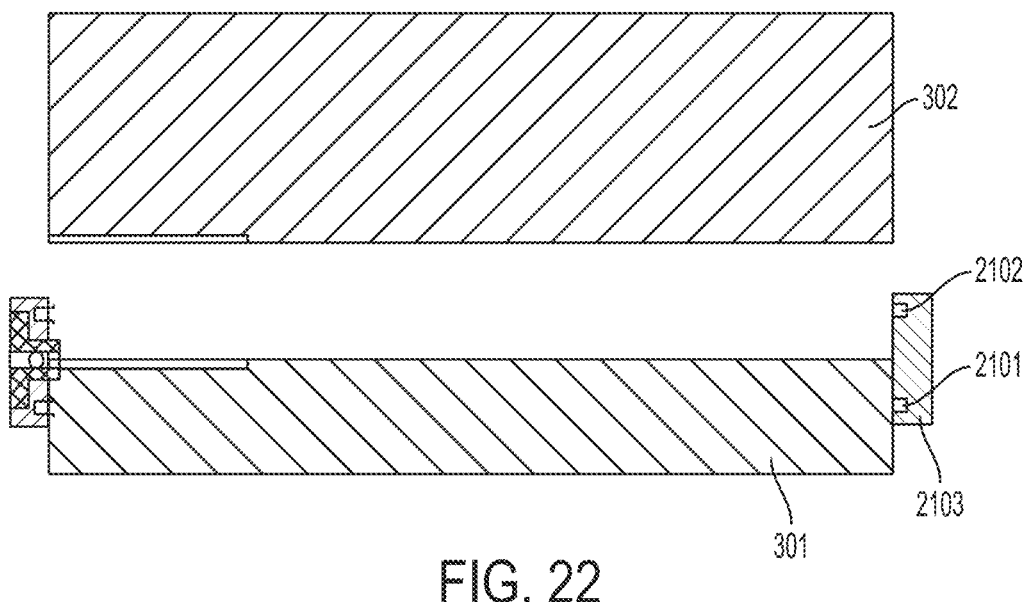
FIG. 22 illustrates an exemplary sealing device that is in a fixed position relative to a platen.

FIGS. 21-22 illustrate an exemplary sealing device that is in a fixed position relative to a platen. In some embodiments, the sealing device comprises a first gasket 2101 and a second gasket 2102. In some embodiments, the first gasket 2101 and the second gasket 2102 are coupled to a frame 2103. In some embodiments, the frame 2103 is fixed to a platen. For example, FIG. 21 illustrates a closed mold with the first platen 301 and the second platen 302, in which the frame 2103 is fixed to the first platen 301. FIG. 22 illustrates the mold when it is open. In some embodiments, no actuator is coupled to the frame 2103. In some embodiments, the frame 2103 can be fixed to the second platen 302 instead of the first platen 301. This exemplary sealing device can provide the same or similar sealing capability as other sealing devices discussed herein. Moreover, this exemplary sealing device can be used in conjunction with, or as a replacement for, other sealing devices discussed herein.

Figure 15:
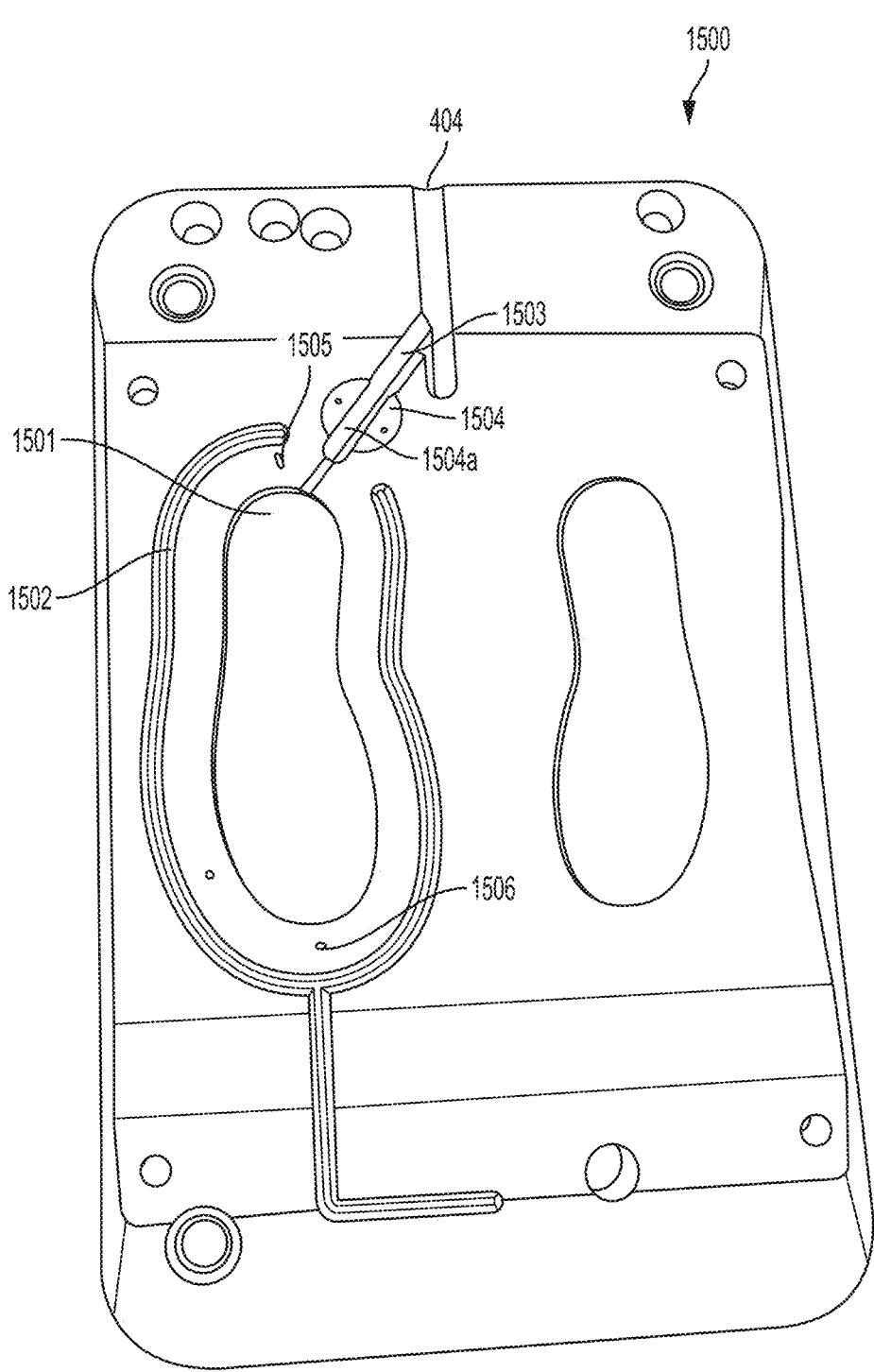
FIG. 15 illustrates an exemplary platen of a molding system.
Figure 16:
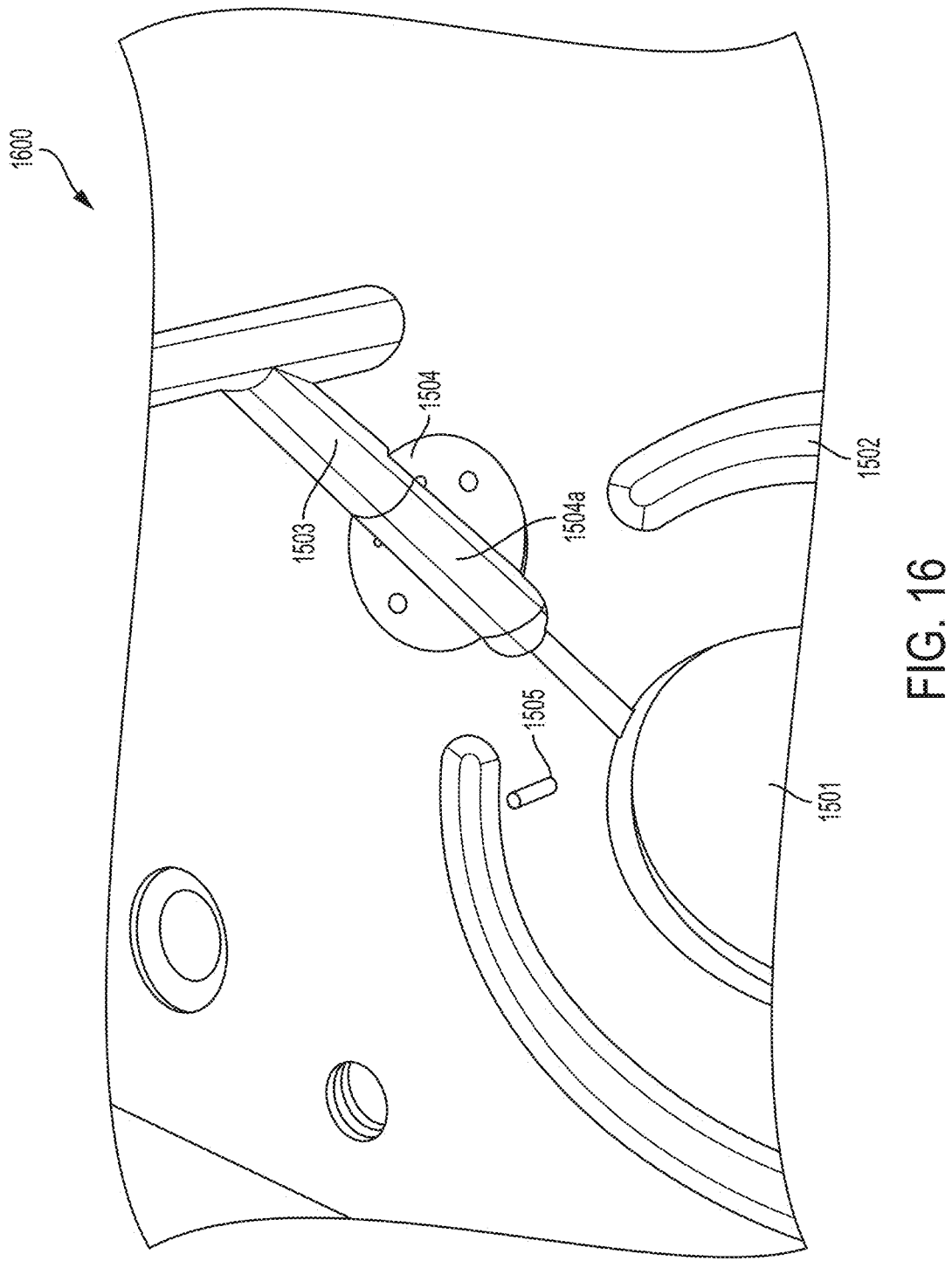
FIG. 16 illustrates a close-up view of a portion of the exemplary platen in FIG. 15.

FIG. 15 illustrates an exemplary platen 1500. The platen 1500 can be an embodiment of the first platen 301 or the second platen 302, which is shown schematically in FIG. 3. In some embodiments, the platen 1500 comprises an opening 404, a mold cavity portion 1501, and an injection channel 1503. A close-up view of the mold cavity portion 1501 and the injection channel 1503 is shown in FIG. 16. In some embodiments, while the mold is closed, a molding material can be injected into the opening 404 of a mold comprising a plurality of platens, at least one of which can be the mold platen 1500. When the molding material is injected, it can flow through the injection channel 1503 into a mold cavity comprising at least one of the mold cavity portions 1501.

In some embodiments, the platen 1500 can further comprise a rotating system 1504. The rotating system 1504 can comprise an injection channel portion 1504*a*. A close-up view of the rotating system 1504 and the injection channel portion 1504*a* is shown in FIG. 16. The rotating system 1504 can be used to allow, block or partially block a flow of a molding material between the mold cavity and the injection channel 1503. The rotating system 1504 can be rotatable within the platen 1500. In some embodiments, the rotating system 1504 can be rotated 360 degrees or less in a clockwise and/or counterclockwise direction.

In some embodiments, the rotating system 1504 can be rotated into a position, where the injection channel portion 1504*a* is aligned or substantially aligned with the injection channel 1503 such that the rotating system 1504 can allow a molding material to flow between the mold cavity and the injection channel 1503. In these embodiments, the rotating system 1504 can be said to be open or in an open mode. For example, the platen 1500, as shown in FIG. 15, shows the rotating system 1504 in an open mode.

In some embodiments, the rotating system 1504 can be rotated into a position, where the injection channel portion 1504*a* is neither aligned nor substantially aligned with the injection channel 1503 but the rotating system 1504 can still allow a molding material to flow between the mold cavity and the injection channel 1503. In these embodiments, the rotating system 1504 can be said to be partially open or in a partially-open mode. In some embodiments, the rotating system 1504 in the partially-open mode can partially block the flow of the molding material between the mold cavity and the injection channel 1503; consequently, the speed at which the molding material flows and/or the volume of the molding material that flows can be limited.

In some embodiments, the rotating system 1504 can be rotated into a position such that the rotating system 1504 does not allow a molding material to flow between the mold cavity and the injection channel 1503. For example, the rotating system 1504 does not allow the molding material to flow by blocking the flow. In these embodiments, the rotating system 1504 can be said to be closed or in a closed mode.

Operations associated with the rotating system 1504 can be integrated into various processes for manufacturing a product of a molding system, such as processes shown in FIGS. 1, 13, and 14. For example, before any molding material is injected into a mold, the rotating system 1504 can be open if it is not already open. After a first molding material has been injected into a mold cavity (e.g. block 102 in FIG. 1) but before placing a second molding material (e.g. block 106 in FIG. 1), the rotating system 1504 can be closed. The second molding material can then be placed at the first molding material (e.g. block 106 in FIG. 1). By closing the rotating system 1504 before the second molding material is placed, any excess molding material in the mold cavity is prevented from flowing into the injection channel 1503 towards the opening 404.

In some embodiments, the rotating system 1504 can be manually controlled. For example, after the first molding material has been injected into the mold cavity and the mold has been open, one or more persons can manually (e.g. using fingers) cause the rotating system 1504 to rotate. In other embodiments, the rotating system 1504 can be automatically controlled. For example, the rotating system 1504 can be coupled to an actuator. In some embodiments, the actuator is an electronic motor, for example a solenoid and/or step motor, that enables, and/or mechanically actuates, the rotating system 1504 to rotate in a clockwise and/or counterclockwise direction. In some embodiments, the actuator can be programmed to automatically control the rotating system 1504. For example, the rotating system 1504 can be programmed to be open before a first molding material is inserted into the mold cavity (e.g. before block 102 in FIG. 1), and the rotating system 1504 can be programmed to be closed after the first molding material is inserted into the mold cavity (e.g. after block 102 in FIG. 1). In some embodiments, the rotating system 1504 can be both manually and automatically controlled. In some embodiments, the actuation of the rotating system is pneumatic. In some embodiments, the actuation of the rotating system is tied to the actuation of the opening and/or closing of the mold, and/or the actuation energy for the rotating system 1504 is supplied by the same energy source as the actuation energy for the opening and/or closing of the mold. And although system 1504 is described as a rotating system, one of ordinary skill in the art will appreciate, based on the disclosure provided herein, that the system 1504 may alternatively be a translating/sliding system, a rotating and/or pivoting system, and/or one or a combination of mechanical systems that operate to selectively block and unblock the injection channel. As such, system 1504 may also be referred to as a selective blocking element.

In some embodiments, the platen 1500 further comprises an overflow channel 1502. A close-up view of a portion of the overflow channel 1502 is shown in FIG. 16. In some embodiments, the overflow channel 1502 is located outer to the mold cavity portion 1501. In some embodiments, a molding material from the mold cavity can flow into the overflow channel 1502. For example, in some cases, an excess amount of a first molding material may have been injected into the mold cavity either intentionally or inadvertently. In these cases, when the rotating system 1504 is closed and a second molding material is placed at the first molding material, some or all of the excess amount of the first molding material and/or the second molding material can overflow to the overflow channel 1502 when the mold is closed. The overflow material may result from the first molding material, the second molding material, or a combination of the first and second molding materials, exceeding the volume of the mold cavity portion 1501, according to some embodiments. The overflow channel 1502 permits excess material to gather together for easy trimming and/or removal from the finished molded product. The overflow channel 1502 may extend around all, or a portion, of the mold cavity portion 1501, according to some embodiments.

In some embodiments, the platen 1500 further comprises one or more centering pins for positioning a molding material. FIG. 15 illustrates a first centering pin 1505 and a second centering pin 1506. A close-up view of the first centering pin 1505 is shown in FIG. 16. In some embodiments, a molding material contains one or more holes, each of which can be used to position the molding material in the mold by placing a centering pin through. For example, after a first molding material has been injected into a mold cavity (e.g. block 102 in FIG. 1), a second molding material with two holes can be placed at the first molding material (e.g. block 106 in FIG. 1) by (1) aligning a first hole with the first centering pin 1505 and aligning a second hole with the second centering pin 1506 and (2) placing the first centering pin 1505 through the first hole and placing the second centering pin 1506 through the second hole. The number of holes in a molding material and/or the number of centering pins in a platen can vary (e.g. one, two, three, or more). Also, the specific steps, in which each hole is aligned with and placed through the corresponding centering pin, can vary.

In some embodiments, a molding material can be positioned without using a centering pin in a platen and/or holes in the molding material. For example, a robot can be used to position and place a second molding material at a first molding material (e.g. at block 106 in FIG. 1). In some embodiments, the robot and/or the mold can have a positioning sensor.

FIG. 16 illustrates a close-up view of a portion 1600 of the exemplary platen 1500. The portion 1600 comprises the mold cavity portion 1501, the overflow channel 1502, the injection channel 1503, the rotating system 1504, the injection channel portion 1504a, and the first centering pin 1505.

Figure 17:
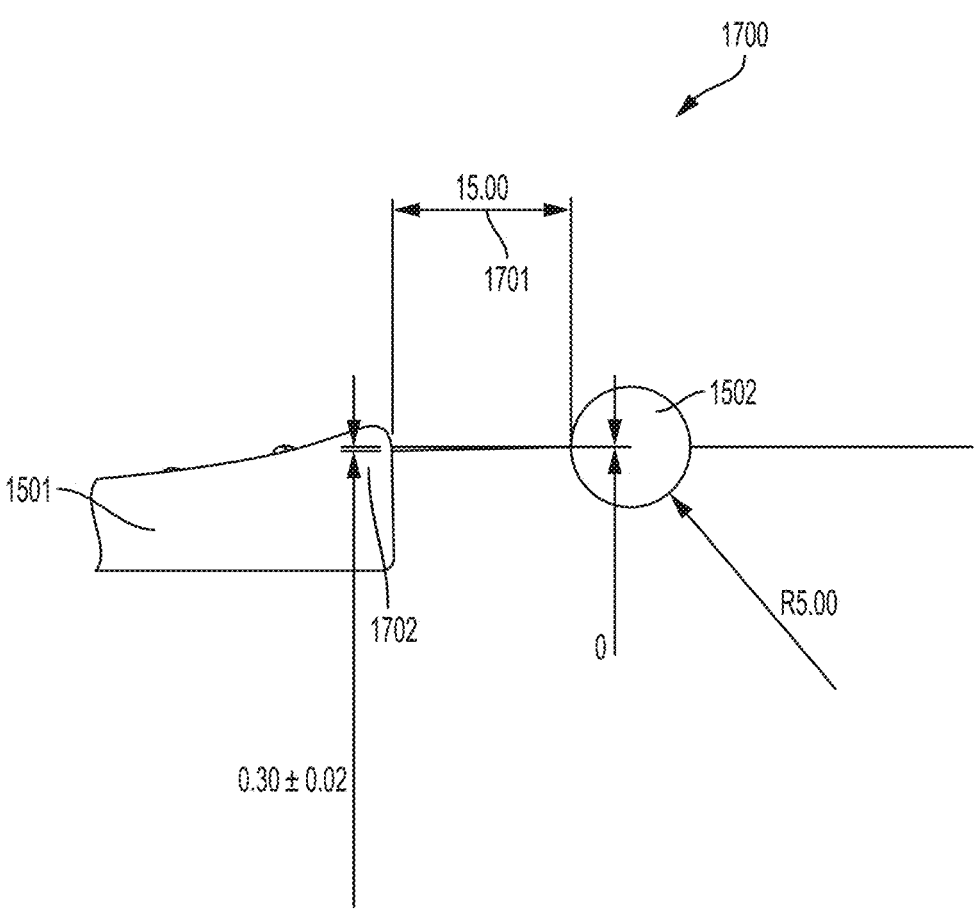
FIG. 17 illustrates a cross-sectional schematic of the exemplary platen.

FIG. 17 illustrates a cross-sectional schematic 1700 of the exemplary platen 1500. In some embodiments, a distance 1701 between the mold cavity portion 1501 and the overflow channel 1502 is constant. For example, FIG. 17 shows that this distance 1701 is 15.00 mm, that the radius of the overflow channel 1502 may be 5.00 mm, and that the opening 1702 between the mold cavity portion 1501 and the overflow channel 1502 tapers from an width of 0.30 mm to zero over a distance 1701 plus the radius of the overflow channel 1502, as shown, according to an embodiment of the present disclosure. In some embodiments, one or more of these measurement numbers can be modified to any suitable number.

Figure 18A:
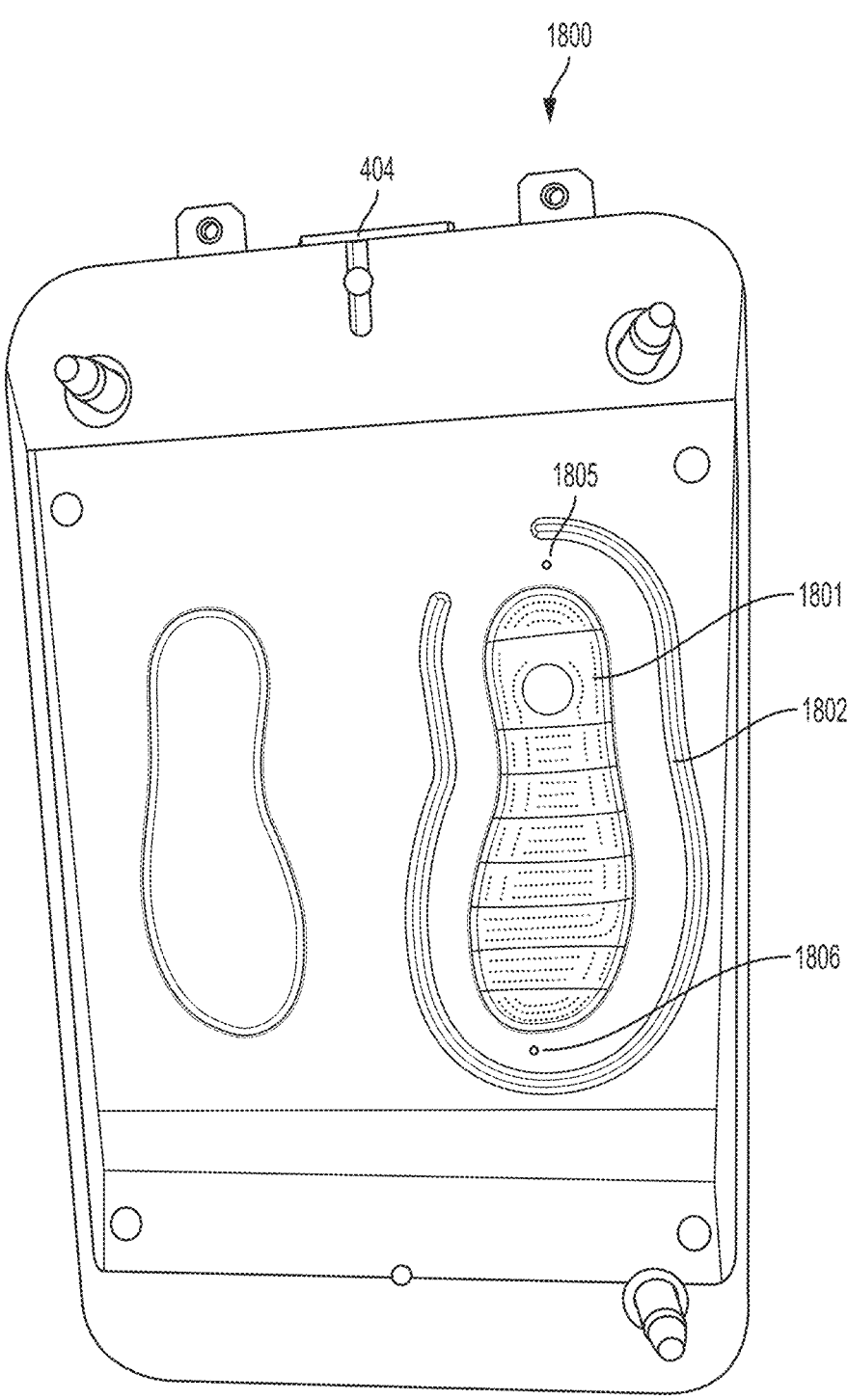
FIG. 18A illustrates an exemplary platen of a molding system.

FIG. 18A illustrates an exemplary platen 1800. The platen 1800 can be an embodiment of the first platen 301 or the second platen 302, which is shown schematically in FIG. 3. In some embodiments, the platen 1800 comprises an opening 404 and a mold cavity portion 1801. In some embodiments, the platen 1800 does not include an injection channel or a rotating system. The platen 1800 can further comprise an overflow channel 1802 that can be aligned with another overflow channel such as the overflow channel 1502. The platen 1800 can further comprise one or more pin holes, through which one or more centering pins from another platen can be placed or rested when the mold is closed. For example, a mold can comprise a bottom platen (e.g. first platen 301 in FIG. 3) and a top platen (e.g. second platen 302 in FIG. 3), where the platen 1500 in FIG. 15 can be the bottom platen, and the platen 1800 can be the top platen. In this example mold, the injection channel 1503 and the rotating system 1504 extend in the bottom platen (i.e. the platen 1500). When the example mold is closed, the first centering pin 1505 rests in the first pin hole 1805, and the second centering pin 1506 rests in the second pin hole 1806. The mold cavity of this example mold comprises the mold cavity portion 1501 of the platen 1500 and the mold cavity portion 1801 of the platen 1800. In some embodiments, when a molding material is positioned without using centering pins (e.g. such as when a robot is used to position a molding material), pin holes such as the first pin hole 1805 and the second pin hole 1806 may not be utilized.

Figure 18B:
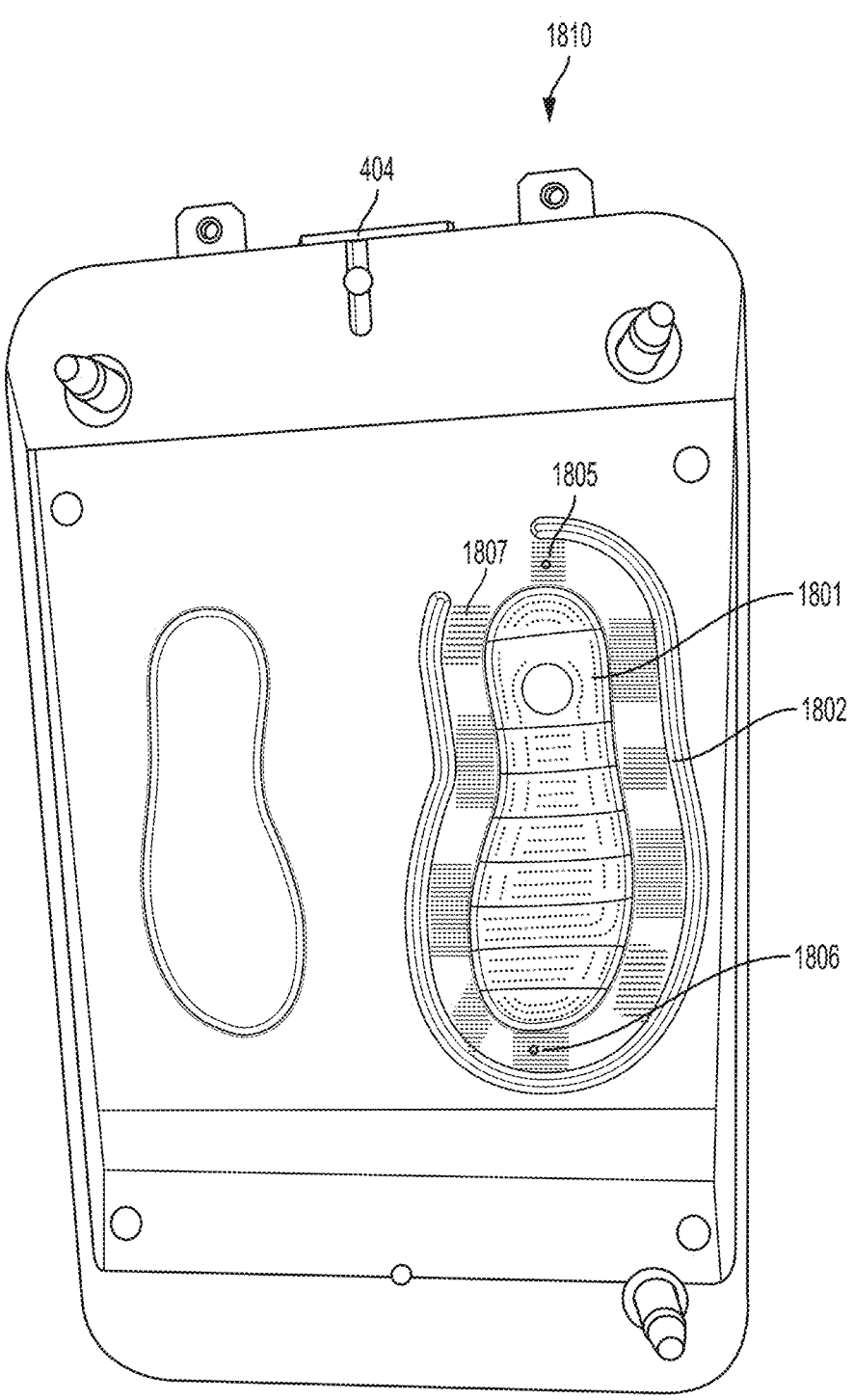
FIG. 18B illustrates an exemplary platen of a molding system.

According to some embodiments, the opening 1702 in FIG. 17 can exist throughout the gap between the mold cavity portion 1801 and the overflow channel 1802. In some embodiments, the opening 1702 in FIG. 17 can exist only in some portions of the gap between the mold cavity portion 1801 and the overflow channel 1802. For example, in FIG. 18B (which illustrates an exemplary platen 1810), the opening 1702 can exist only in portions of the gap that are marked with horizontal stripes (e.g. a portion 1807). In the other portions of the gap, the opening 1702 may not exist. The number and/or the size of the portions of the gap that have the opening 1702 can vary. In some embodiments, the opening 1702 can exist underneath the surface of the platen.

The platen can be designed in various ways to produce desired results with respect to how a material can flow from the mold cavity portion 1801 to the overflow channel 1802. In some embodiments, one or more of the measurement numbers in FIG. 17, the number of the portions of the gap that have the opening 1702 in FIG. 18B, and/or the size of the portions of the gap that have the opening 1702 in FIG. 18B can be varied to produce desired results. For example, a design can allow a first material to be injected to the mold cavity portion 1801 without overflowing to the overflow channel 1802, while an injection of a second material can cause some of the first material and/or some of the second material to overflow to the overflow channel 1802. As another example, a design can allow some of a first material to overflow to the overflow channel 1802 when the first material is injected to the mold cavity portion 1801, while an injection of a second material can cause some of the first material and/or some of the second material to also overflow to the overflow channel 1802. Yet in another example, a design can disable the use of the overflow channel 1802.

Figure 19:
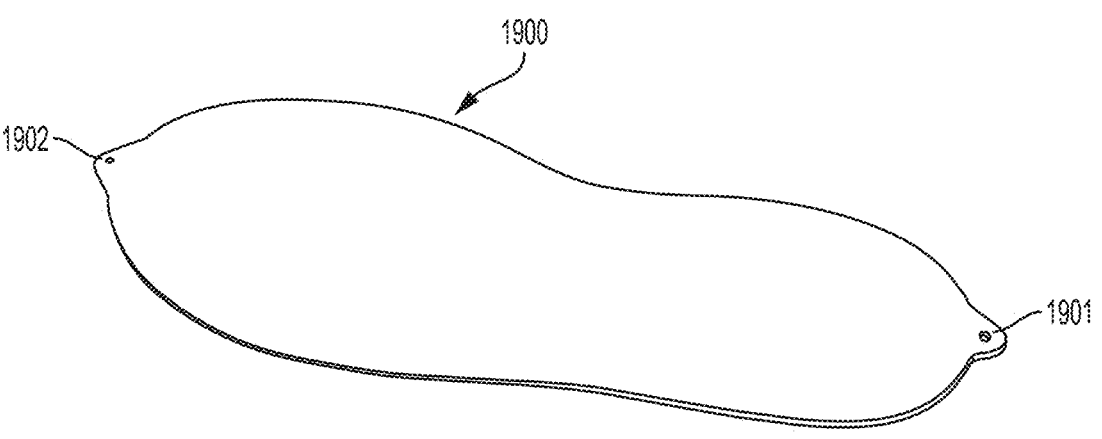
FIG. 19 illustrates an exemplary molding material.

FIG. 19 illustrates an exemplary molding material 1900. In some embodiments, the molding material 1900 can have a first hole 1901 and a second hole 1902. These holes can be used, for example, to position the molding material 1900 in a mold. For example, the molding material 1900 can be a second molding material that is placed at a first molding material (e.g. block 106 in FIG. 1) in a mold that comprises the platen 1500 (i.e. the bottom platen) and the platen 1800 (i.e. the top platen). In this example, the first hole 1901 can be placed through the first centering pin 1505, and the second hole 1902 can be placed through the second centering pin 1506. When the mold is closed, the first centering pin 1505 can rest in the first pin hole 1805, and the second centering pin 1506 rests in the second pin hole 1806.

Figure 20:
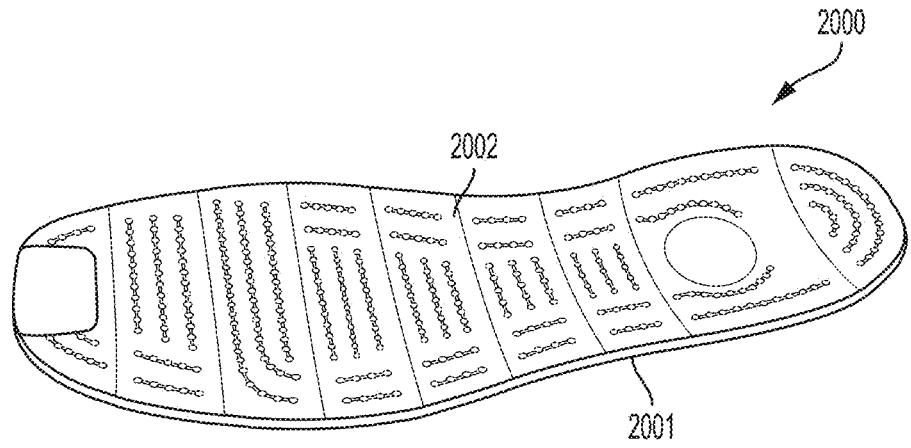
FIG. 20 illustrates an exemplary product of a molding system.

FIG. 20 illustrates an exemplary product, an insole 2000, of a molding system. The insole 2000 comprises a first molding material 2001 and a second molding material 2002. The second molding material 2002 illustrates the molding material 1900 after the insole 2000 has been manufactured according to a disclosed process, such as the process illustrated in FIG. 1. In some embodiments, one or more holes, such as the first hole 1901 and the second hole 1902, are removed from a manufactured product, such as the insole 2000. In some embodiments, a manufacturing process can cause a specific design to be imprinted on a molding material. Such a design can include a drawing, a pattern, a logo, text, and/or any other shapes and forms. For example, after the molding material 1900 has undergone a manufacturing process, the design on the surface of the mold cavity portion 1801 is imprinted in the molding material 1900, as shown in the second molding material 2002, which is a part of the insole 2000.

Figure 23:
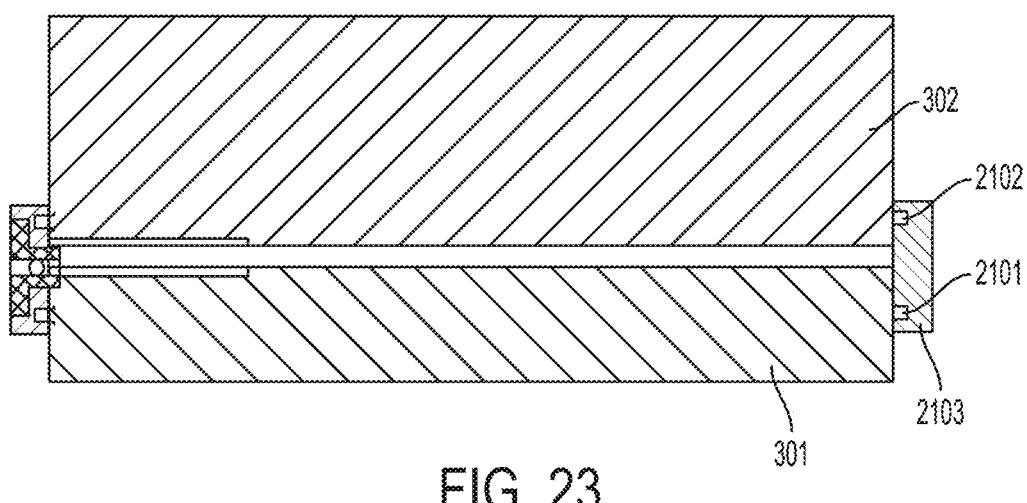
FIG. 23 illustrates an exemplary sealing device that is in a fixed position relative to a platen.

FIG. 23 illustrates the exemplary sealing device in FIGS. 21-22 when the mold is partially open. In some embodiments, the exemplary sealing device can provide a sealing ring around the mold, where the sealing ring is in a fixed position relative to a platen (e.g. the first platen 301). In some embodiments, a vacuum can be created inside a mold cavity when the mold is partially open as shown in FIG. 23. The mold can be partially open when a space exists between the first platen 301 and the second platen 302 but the space is sealed by the sealing device. For example, the mold can be partially open when a vertical distance of the space between the first platen 301 and the second platen 302 is less than a vertical distance of the space between the first gasket 2101 and the second gasket 2102 such that the first gasket 2101 and the second gasket 2102 seal the space between the first platen 301 and the second platen 302. In some embodiments, when the mold is partially open, the space between the first platen 301 and the second platen 302 can be between 1 cm and 2 cm. However, this space can be any suitable value that can vary depending on the mold structure. In some embodiments, when the mold is partially open, a gas remover (e.g. the gas remover described herein) can remove a gas from the space between the first platen 301 and the second platen 302 to create a vacuum.

FIGS. 24-28 illustrate an exemplary platen 2400 and an exemplary platen 2500. The platen 2400 can be an embodiment or variation of the first platen 301 or the second platen 302, which is shown schematically in FIG. 3. In some embodiments, the platen 2400 comprises a mold cavity portion 2401. While the platen 2400 shows an outer opening, an injection channel, and another mold cavity portion on the right side that are similar, respectively, to the outer opening 404, the injection channel 1503, and the mold cavity portion 1501 in FIG. 15, these elements need not be part of the platen 2400. The platen 2400 can also include an overflow channel 2402, which can serve a role similar to the overflow channel 1502 in FIG. 15. In some embodiments, while the overflow channel 1502 can have an interruption point where the injection channel 1503 crosses and extends to the mold cavity portion 1501, the overflow channel 2402 can be continuous as there is no injection channel that needs to cross and extend to the mold cavity portion 2401.

According to some embodiments, a gap exists between the mold cavity portion 2401 and the overflow channel 2402. The overflow channel 2402 and the gap can allow the mold platens to be repeatedly used for production without a need to clean the mold platens between each use. Without an overflow channel and gap, the mold platens may in some instances need to be cleaned between each use. For example, when the first molding material is injected into the mold cavity, it can occupy the whole volume of the mold cavity. Then, the mold opens, and the second molding material is placed on top of the first molding material. Since there is no room in the mold cavity for accommodating the second molding material in some embodiments, some of the first molding material and/or some of the second molding material would leak out of the cavity, possibly relocating the mold part line and getting the mold platens dirty. Such mold platens may require cleaning prior to subsequent use, according to some embodiments. In some embodiments, the mold platens with an overflow channel and gap can allow the first molding material to occupy the whole volume of the mold cavity and possibly part of the gap but not the overflow channel. When the second molding material is added, the volume of the cavity, gap, and the overflow channel can be mostly or entirely occupied. Then, the first and second molding materials can expand and crosslink, such that they can be removed from the mold platens easily without any cleaning, according to some embodiments.

Figure 24:
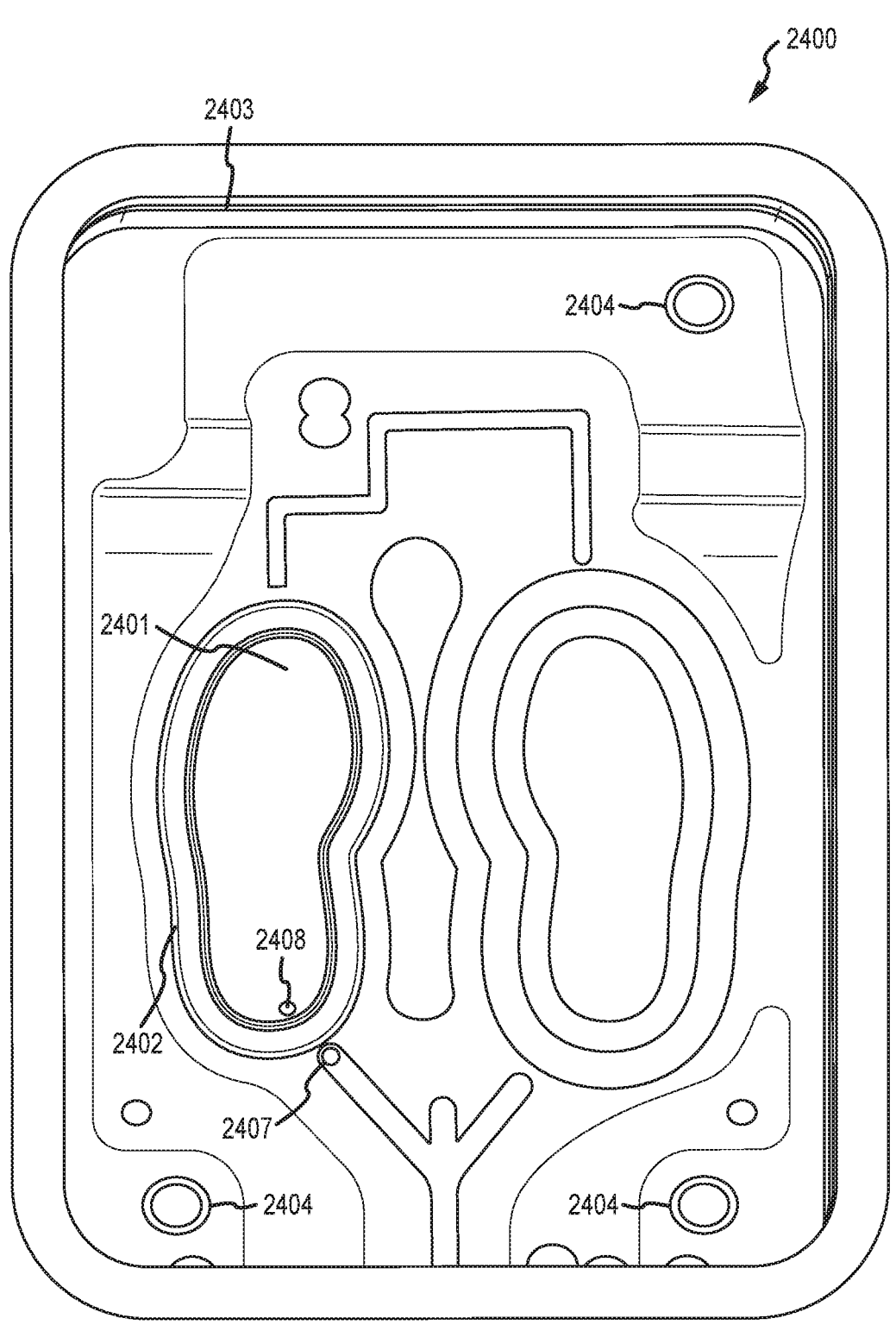
FIG. 24 illustrates an exemplary platen.
Figure 25:
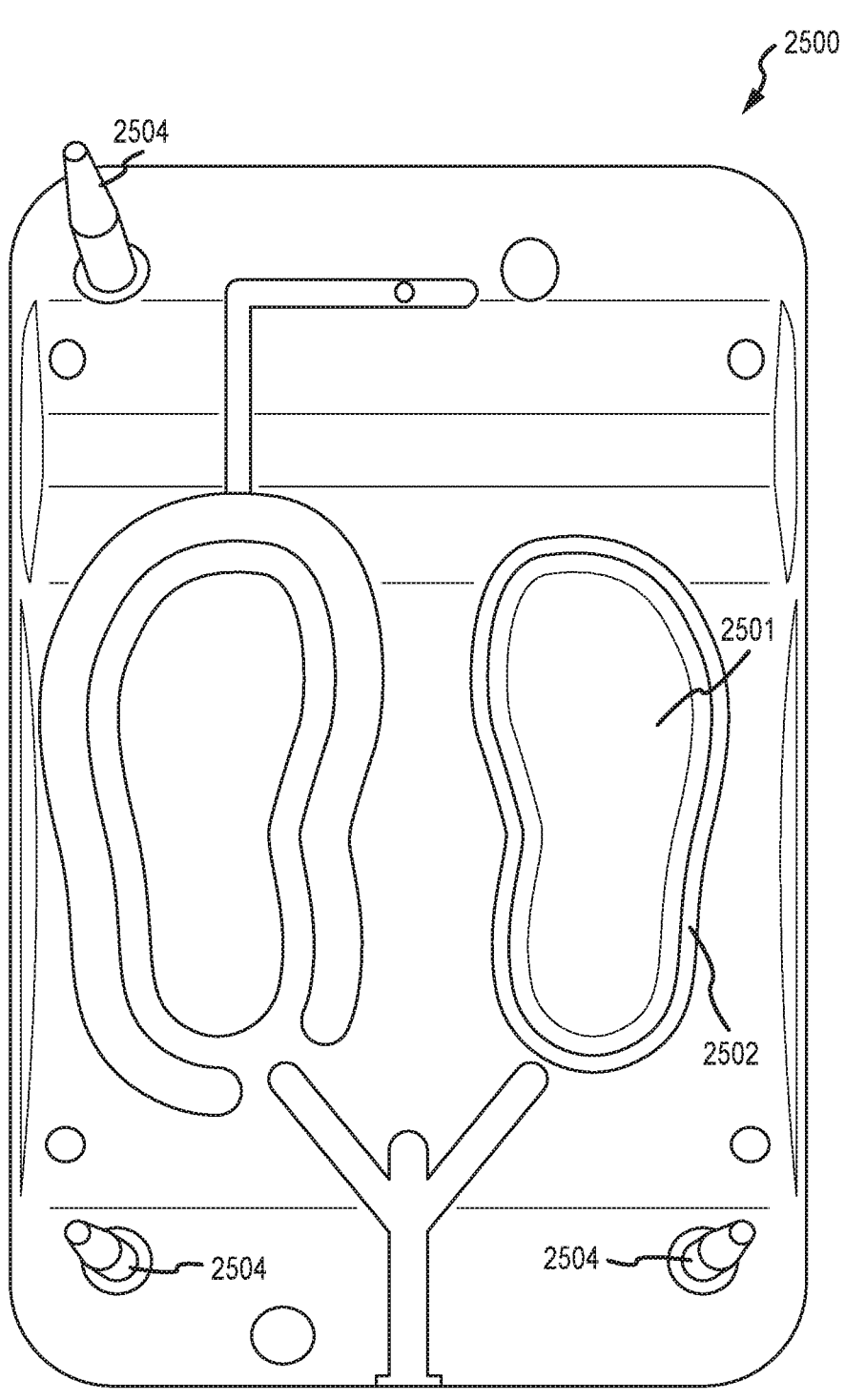
FIG. 25 illustrates an exemplary platen.

FIG. 25 illustrates an exemplary platen 2500. The platen 2500 can be an embodiment or variation of the first platen 301 or the second platen 302, which is shown schematically in FIG. 3. In some embodiments, the platen 2500 comprises a mold cavity portion 2501. The platen 2500 can further comprise an overflow channel 2502 that can be aligned with another overflow channel such as the overflow channel 2402 (FIG. 24). In some embodiments, a mold cavity can comprise the mold cavity portion 2401 of the platen 2400 (FIG. 24) and the mold cavity portion 2501 of the platen 2500. While the platen 2500 shows an outer opening and another mold cavity portion on the left side that are similar, respectively, to the outer opening 404 and the mold cavity portion 1801, these elements need not be part of the platen 2500. The platen 2500 can also include an overflow channel 2502, which can serve a role similar to the overflow channel 1802 (FIG. 18). In some embodiments, while the overflow channel 1802 can have an interruption point where the injection channel 1503 (FIG. 15) crosses and extends to the mold cavity portion 1801, the overflow channel 2502 can be continuous as there is no injection channel that needs to cross and extend to the mold cavity portion 2501.

According to some embodiments, similar techniques for positioning a molding material in a platen as described in reference to FIG. 15 can also apply to FIGS. 24-25. For example, one or more centering pins, holes, and/or a robot can be used to position a molding material in the molding cavity of the mold shown in FIGS. 24-25. Platen 2400 may include one or more guide holes 2404, and platen 2500 may include one or more guide posts 2504 configured to be accepted into guide holes 2404 to maintain properly alignment and/or travel trajectory among platens 2400 and 2500 during molding and closure, according to embodiments of the present disclosure.

Figure 26:
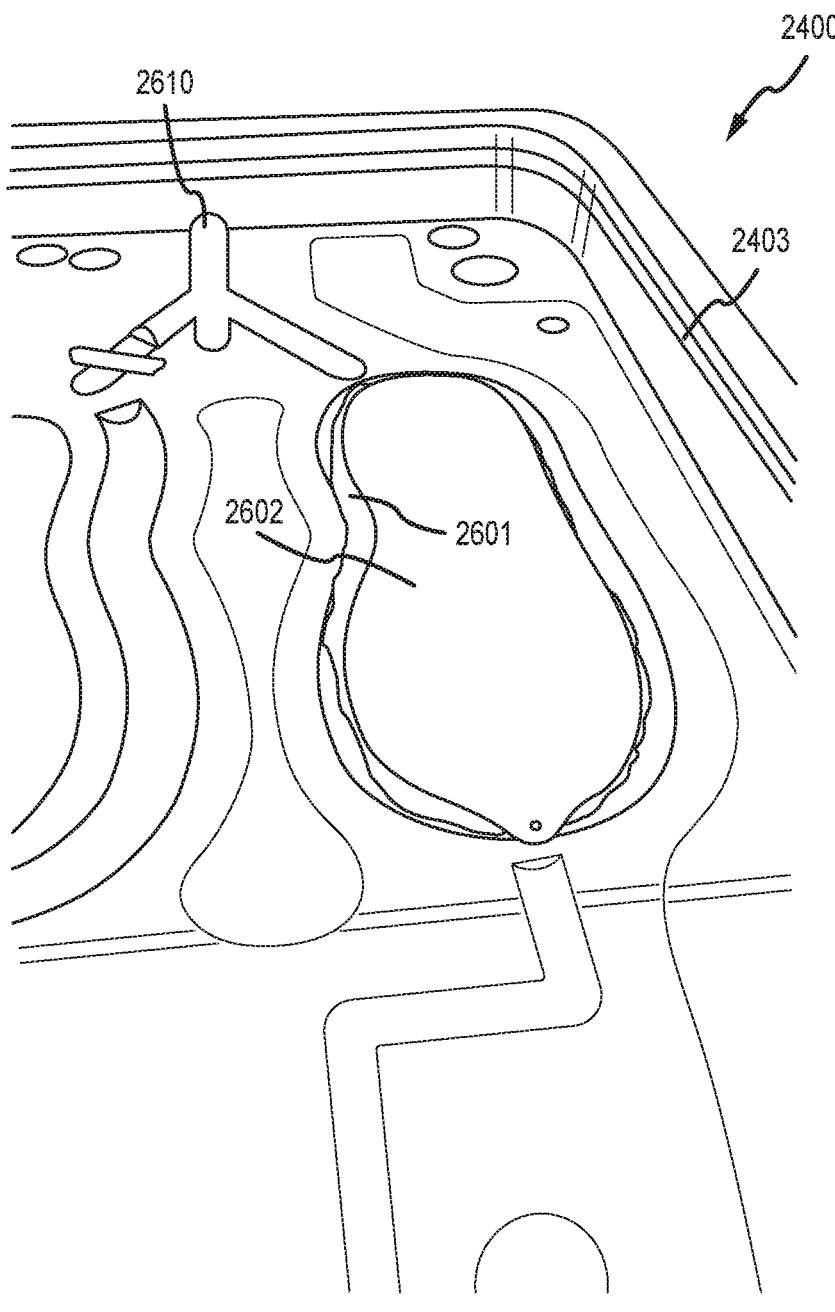
FIG. 26 illustrates an exemplary platen with a first molding material and a second molding material.
Figure 27:
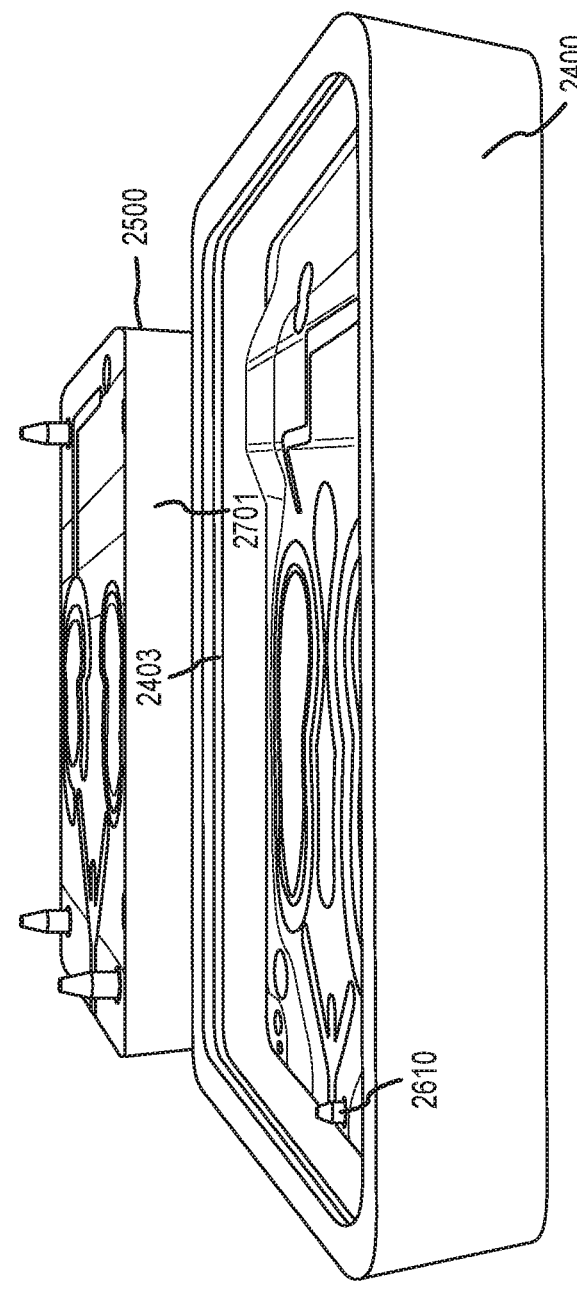
FIG. 27 illustrates exemplary top and bottom platens side-by-side.
Figure 28:
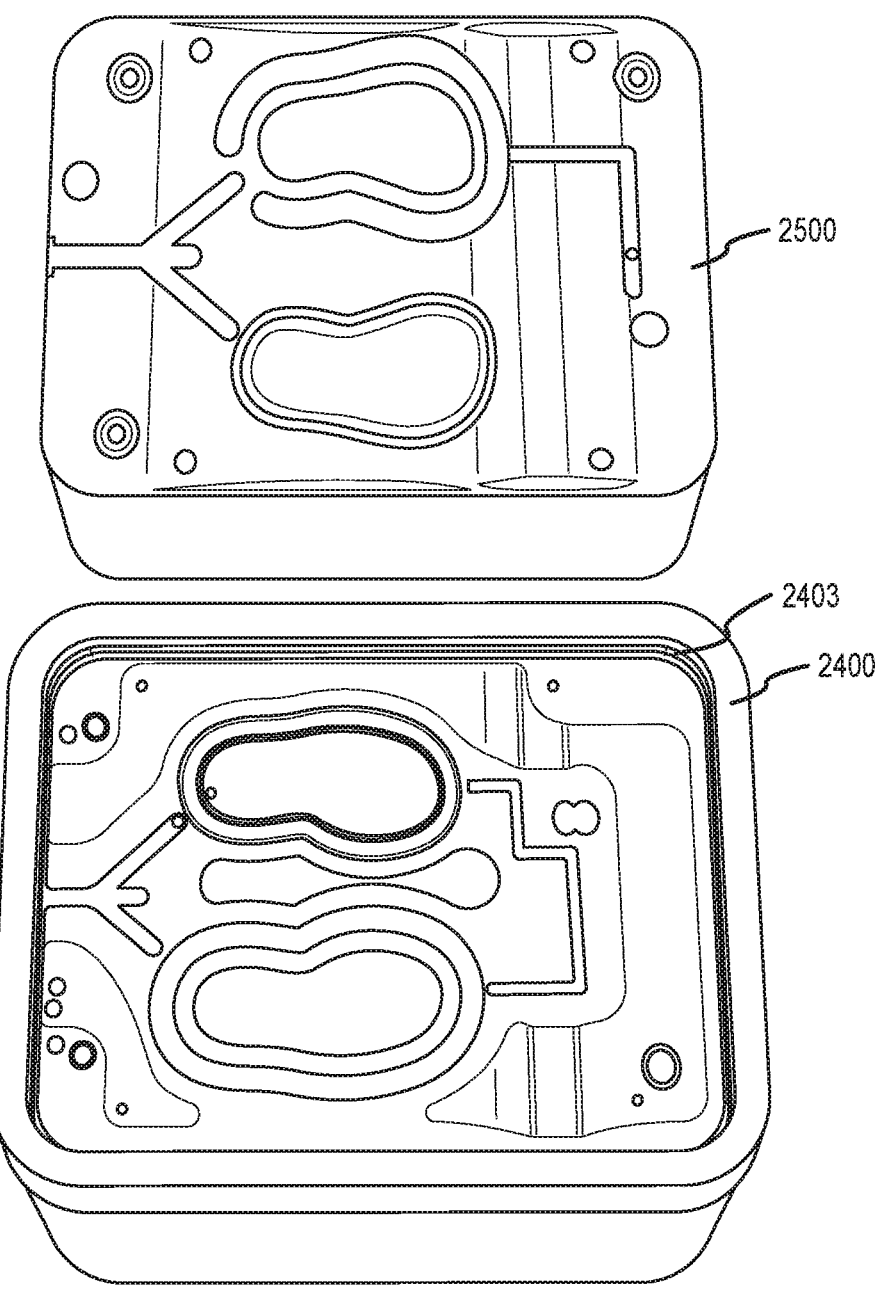
FIG. 28 illustrates another view of the exemplary platens of FIG. 27.

FIG. 26 illustrates a platen with a first molding material 2601 and a second molding material 2602 located within a mold cavity portion of the platen. The combination of the first molding material 2601 and the second molding material 2602 can represent an exemplary product, an insole, that has been produced by the platen 2400 (FIG. 24) and the platen 2500 (FIG. 25) in accordance with a production process described herein.

According to some embodiments of the present disclosure, the platens of FIGS. 24-28 do not include a fixed frame 2103 with one or more sealing gaskets 2101 and/or 2102 (or movable frame 703 with gaskets 701, 702), but instead platen 2400 includes a gasket 2403 on or within an inner wall of platen 2400. In some embodiments, gasket 2403 protrudes from the wall of platen 2400 inwardly, and in some embodiments, gasket 2403 extends around an entire inner perimeter of the platen 2400, such that when platen 2500 is mated with and lowered onto platen 2400, the outer surface 2701 of platen 2500 (which may be a smooth continuous surface for this purpose) sealingly engages with and/or mates with the gasket 2403, such that the gasket 2403 seals up against the outer wall 2701 to seal the space between the two platens 2400, 2500. In some embodiments, gasket 2403 is located closer to the top edge of the platen 2400 such that gasket 2403 not only seals the space between platens 2400, 2500 when the platens 2400, 2500 are completely closed, but also seals the space between the platens 2400, 2500 when the platens 2400, 2500 are separated a certain distance with respect to each other, such that a lowermost edge of platen 2500 or adjacent sidewall 2701 still sealingly engages with the gasket 2403 (such as, for example, when the platens 2400, 2500 are only partially closed after insertion of the second material. In such embodiments, after the platens 2400, 2500 are opened with respect to each other, the closing of platens 2400, 2500 simultaneously removes the gas from the space and seals the platens 2400, 2500 together at the gasket. In some embodiments, the gasket 2403 extends partially around an inner perimeter of platen 2400, and in yet other embodiments, the gasket 2403 extends in an alternating pattern around an inner perimeter of platen 2400. In some embodiments, the gasket is located about an outer perimeter of the sidewall 2701 of platen 2500; in other embodiments, each of platen 2400 and 2500 includes a gasket for better or mating sealing performance.

Figure 29:
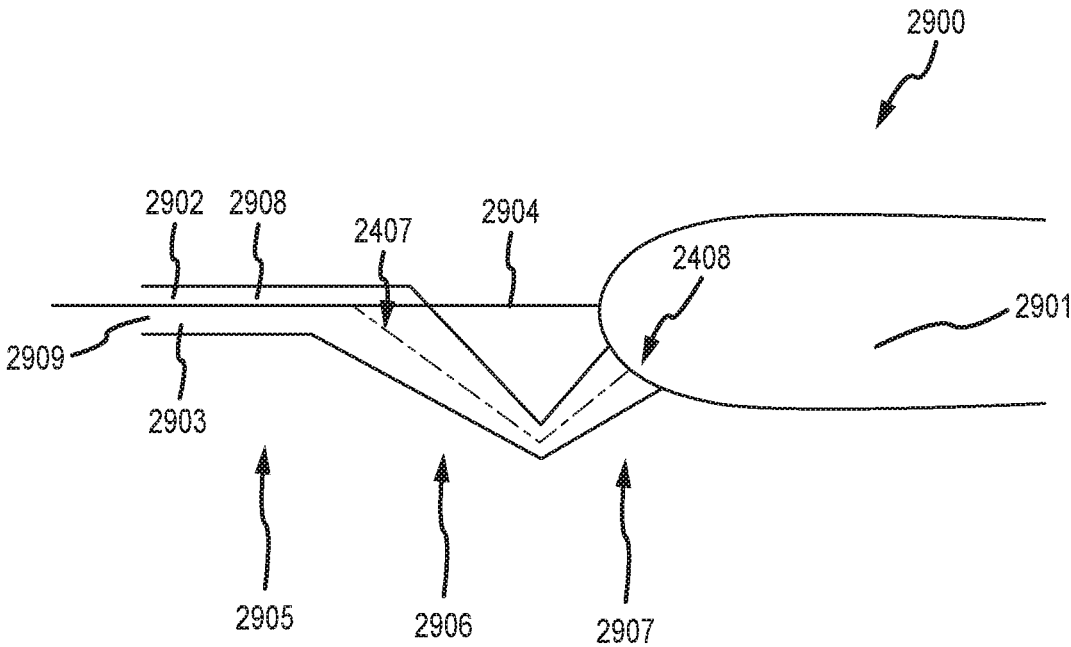
FIG. 29 illustrates a cross-sectional schematic of an exemplary molding system.

FIG. 29 illustrates a cross-sectional schematic of an exemplary molding system 2900. The molding system 2900 can include a mold cavity 2901. In some embodiments, the mold cavity 2901 can be formed by at least a mold cavity portion of a first platen and a second platen when the first platen is in contact with the second platen. Line 2904 can represent the mold part line. A molding material can be injected through an outer opening 2909. The molding material can travel to the cavity 2901 via a channel 2908. In some embodiments, the channel 2908 can comprise multiple portions. For example, the channel 2908 can comprise three portions: a straight portion 2905, a first conical portion 2906, and a second conical portion 2907. The channel 2908 with a conical portion(s) can allow the molding material inside the channel 2908 to be more easily removed compared to a channel without any conical or similarly tapered or partially tapered shape to its inside surface. In some embodiments, the straight portion 2905 can include a bottom portion 2903 (which can be a part of the first platen) and a top portion 2902 (which can be a part of the second platen). In some embodiments, most (or all) of the first conical portion 2906 can reside in one of the platens (e.g., the first platen). In some embodiments, all of the second conical portion 2907 can reside in one of the platens (e.g., the first platen, and/or the same platen in which the first conical portion 2906 resides). By having at least some portion of the channel 2908 entirely below the line 2904, the channel 2908 can allow a continuous overflow channel, such as the overflow channel 2402 shown in FIG. 24. According to some embodiments of the present disclosure, the channel 2908 operates as a tunnel running under the overflow channel, resulting in an uninterrupted and/or continuous overflow channel, thereby improving performance and ease of use and cleaning.

According to some embodiments of the present disclosure, the tunneling injection channel 2908 can be seen in the platen 2400 of FIG. 24, in which the opening 2407 of the first conical portion 2906 is on one side of the overflow/expansion channel 2402, and the opening 2408 of the second conical portion 2907 is on the other side of the overflow/expansion channel 2402. As illustrated in FIG. 24, the overflow channel 2402 is uninterrupted and/or continuous because the injection channel 2908 tunnels under the overflow channel 2402.

Various other modifications and additions can be made to the exemplary embodiments discussed without departing from the scope of the present disclosure. For example, while the embodiments described above refer to particular features or particular steps, the scope of this disclosure also includes embodiments having different combinations of features or steps, and embodiments that do not include all of the above described features or steps.

The invention claimed is:

1. A molding system comprising:
a mold, the mold comprising a first platen, a second platen and a mold cavity, the mold cavity formed by at least a mold cavity portion of a first platen and a second platen when the first platen is in contact with the second platen;
a sealing device that is configured to seal a space between the first and second platens;
a gas remover that is configured to remove a gas from the space between the first and second platens while the space is sealed; and an overflow channel formed within the first platen, the overflow channel being separate from the mold cavity; and
a tunneling injection channel formed in the first platen and having a first end and a second end, the first end opening on one side of the overflow channel, the second end opening in the mold cavity portion.

2. The molding system of claim 1,
wherein the overflow channel at least partially surrounds the mold cavity portion of the first platen.

3. The molding system of claim 1,
wherein the overflow channel is continuous and entirely surrounds the mold cavity portion of the first platen.

4. The molding system of claim 3, the tunneling injection channel extending completely underneath of, and without interrupting, the continuous overflow channel.

5. The molding system of claim 3, the tunneling injection channel comprising a conical portion tapering from the first end toward the second end.

6. The molding system of claim 5, wherein the conical portion is a first conical portion, the tunneling injection channel further comprising a second conical portion tapering from the second end toward the first end.

7. The molding system of claim 3, the tunneling injection channel comprising a conical portion tapering from the second end toward the first end.

8. The molding system of claim 2, further comprising an opening extending between a perimeter of the mold cavity and the overflow channel when the first platen is in contact with the second platen, wherein the perimeter alternates between portions where the opening exists, and portions where the opening does not exist.

9. The molding system of claim 1, wherein the sealing device comprises a gasket protruding inwardly from a wall of the first or second platen.

10. The molding system of claim 9, wherein the gasket encircles an inner perimeter of the wall of the first or second platen.

11. The molding system of claim 1, wherein the sealing device comprises a gasket protruding outwardly from a wall of the first or second platen.

12. The molding system of claim 11, wherein the gasket encircles an outer perimeter of the wall of the first or second platen.

13. The molding system of claim 1, wherein the sealing device comprises a frame that is coupled to at least two gasket rings.

14. The molding system of claim 13, wherein the at least two gasket rings comprise silicon.

15. The molding system of claim 1, wherein at least one of the first platen and the second platen comprises a selective blocking element configured to selectively block an injection channel in the mold.

16. The molding system of claim 15, wherein the selective blocking element is mechanically actuated.

* * * * *